United States Patent
Ma et al.

(10) Patent No.: US 10,624,146 B2
(45) Date of Patent: Apr. 14, 2020

(54) RADIO LINK FAILURE HANDLING METHOD, RELATED DEVICE, AND COMMUNICATIONS SYSTEM

(71) Applicant: HUAWEI TECHNOLOGIES CO., LTD., Shenzhen, Guangdong (CN)

(72) Inventors: Jie Ma, Shenzhen (CN); Bo Lin, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/238,899

(22) Filed: Jan. 3, 2019

(65) Prior Publication Data
US 2019/0141771 A1 May 9, 2019

Related U.S. Application Data

(63) Continuation of application No. PCT/CN2016/088483, filed on Jul. 4, 2016.

(51) Int. Cl.
*H04W 76/18* (2018.01)
*H04W 76/25* (2018.01)
(Continued)

(52) U.S. Cl.
CPC .......... *H04W 76/18* (2018.02); *H04W 76/19* (2018.02); *H04W 76/25* (2018.02); *H04W 76/27* (2018.02); *H04W 84/042* (2013.01); *H04W 88/04* (2013.01)

(58) Field of Classification Search
CPC ..... H04W 76/14; H04W 88/04; H04W 92/18; H04W 4/70; H04W 76/23; H04W 36/30;
(Continued)

(56) References Cited

U.S. PATENT DOCUMENTS

| 2010/0182916 A1* | 7/2010 | Drewes .............. H04B 7/15521 370/252 |
| 2011/0117907 A1 | 5/2011 | Hooli et al. |

(Continued)

FOREIGN PATENT DOCUMENTS

| CN | 104468029 A | 3/2015 |
| CN | 104811982 A | 7/2015 |

(Continued)

OTHER PUBLICATIONS

International Search Report dated Mar. 31, 2017 in corresponding International Application No. PCT/CN2016/088483.
Extended European Search Report dated Apr. 17, 2019 in corresponding European Patent Application No. 16907758.3 (8 pages).
International Search Report dated Mar. 31, 2017 in corresponding International Patent Application PCT/CN2016/088483 (7 Pages).
(Continued)

*Primary Examiner* — Daniel Lai
(74) *Attorney, Agent, or Firm* — Womble Bond Dickinson (US) LLP

(57) ABSTRACT

Embodiments of the present invention disclose a radio link failure handling method, a related device, and a communications system. The method includes: when a base station acquires that a relay link between the base station and remote terminal device fails and a first cellular direct link between the base station and the remote terminal device is normal, sending, by the base station, a first reconfiguration message to the remote terminal device, and sending a second reconfiguration message to relay terminal device.

18 Claims, 14 Drawing Sheets

(51) Int. Cl.
*H04W 76/19* (2018.01)
*H04W 76/27* (2018.01)
*H04W 84/04* (2009.01)
*H04W 88/04* (2009.01)

(58) Field of Classification Search
CPC ... H04W 24/04; H04W 72/04; H04W 72/042; H04W 76/27; H04W 36/0055; H04W 36/03; H04W 40/22; H04W 72/0413; H04W 88/02; H04W 88/06; H04W 36/14; H04W 60/04; H04W 72/0406; H04W 72/048; H04W 36/0016; H04W 4/80; H04W 72/1289; H04W 76/12; H04W 76/18; H04W 36/00; H04W 76/10; H04W 76/19; H04W 84/12; H04W 36/0005; H04W 36/0094; H04W 40/10; H04W 40/12; H04W 40/34; H04W 4/20; H04W 76/11; H04W 8/08; H04W 28/04; H04W 36/0011; H04W 36/20; H04W 40/02; H04W 40/14; H04W 40/24; H04W 4/08; H04W 76/25; H04W 76/34; H04W 84/042
See application file for complete search history.

(56) References Cited

U.S. PATENT DOCUMENTS

| | | |
|---|---|---|
| 2015/0245402 A1* | 8/2015 | Mochizuki ............ H04W 76/15 370/331 |
| 2016/0157254 A1 | 6/2016 | Novlan et al. |
| 2016/0183135 A1 | 6/2016 | Kang et al. |
| 2016/0242224 A1 | 8/2016 | Liu et al. |
| 2016/0337889 A1* | 11/2016 | Jung .................... H04W 24/04 |
| 2017/0026896 A1* | 1/2017 | Enomoto .............. H04W 40/20 |
| 2018/0124619 A1 | 5/2018 | Xu et al. |

FOREIGN PATENT DOCUMENTS

| | | |
|---|---|---|
| CN | 104919741 A | 9/2015 |
| CN | 105580486 A | 5/2016 |
| EP | 2314118 | 4/2011 |
| EP | 2903390 A1 | 8/2015 |
| WO | 2015047051 A1 | 4/2015 |
| WO | 2015143170 A1 | 9/2015 |

OTHER PUBLICATIONS

Written Opinion of the International Searching Authority dated Mar. 31, 2017 in corresponding International Patent Application PCT/CN2016/088483 (4 Pages).

* cited by examiner

RADIO LINK FAILURE HANDLING METHOD, RELATED DEVICE, AND COMMUNICATIONS SYSTEM

CROSS-REFERENCE TO RELATED APPLICATIONS

This application is a continuation of International Application No. PCT/CN2016/088483, filed on Jul. 4, 2016, the disclosure of which is hereby incorporated by reference in its entirety.

TECHNICAL FIELD

The present invention relates to the field of communications technologies, and in particular, to a radio link failure handling method, a related device, and a communications system.

BACKGROUND

At present, a Long Term Evolution (LTE) system adopts a centralized network control manner, that is, uplink data and downlink data of terminal device are sent and received under the control of a network. As shown in FIG. 1, communication between terminal devices is forwarded and controlled by a network, there is no direct communication link between the terminal devices, and the terminal device is not allowed to send uplink data by itself.

As shown in FIG. 2, in a device-to-device (D2D) communication mode, terminal devices can directly communicate with each other without transmission or forwarding performed by a device such as an evolved NodeB (referred to as an eNB). The direct communication link can be established under the control or with the assistance of a network. D2D communication between terminal devices may be performed based on a D2D discovery process for terminal devices that are close to each other. In this case, terminal device located at a remote end may directly communicate with relay (English: Relay) terminal device in the D2D communication mode, and the relay terminal device is directly connected to the evolved NodeB in a cellular manner. The remote terminal device may directly communicate with the evolved NodeB in a cellular communication manner, or may perform relay communication with the evolved NodeB by using the relay terminal device.

In the prior art, for terminal device having two communication modes, that is, a cellular module and a D2D communications module, a radio link failure (RLF) is likely to occur in both a direct cellular communication process and a D2D relay communication process. When a radio link failure occurs in cellular communication or D2D communication of the terminal device, no corresponding communication control solution is available in the prior art to ensure effective communication of the terminal device.

SUMMARY

Embodiments of the present invention provide a radio link failure handling method, a related device, and a communications system, so that normal communication of remote terminal device can be ensured when a radio link failure occurs in a cellular direct communication process or a relay communication process of the remote terminal device.

According to a first aspect, a radio link failure handling method is provided, including:

when a base station acquires that a relay link between the base station and remote terminal device fails and a first cellular direct link between the base station and the remote terminal device is normal, sending, by the base station, a first reconfiguration message to the remote terminal device, and sending a second reconfiguration message to relay terminal device, where the relay link includes a terminal-to-terminal direct link between the remote terminal device and the relay terminal device and a second cellular direct link between the relay terminal device and the base station, the failure of the relay link includes at least one of a failure of the terminal-to-terminal direct link and a failure of the second cellular direct link, the first reconfiguration message is used to instruct the remote terminal device to switch a transmission path of a communication service from the relay link to the first cellular direct link, and the second reconfiguration message is used to instruct the relay terminal device to delete link related information corresponding to the remote terminal device.

By performing the foregoing steps, when the relay link between the remote terminal device and the base station fails, the base station instructs the relay terminal device to delete link configuration information and/or a buffered data packet that are/is corresponding to the remote terminal device, so as to release corresponding resources and reduce resource occupation, and the base station instructs the remote terminal device to switch a communication link, to instruct the remote terminal device to no longer use the relay link to communicate with the base station but use the cellular direct link to communicate with the base station, thereby ensuring normal operation of the service and avoiding communication interruption.

With reference to the first aspect, in a first implementation of the first aspect, before the sending, by the base station, a first reconfiguration message to the remote terminal device, the method further includes:

receiving, by the base station, a first indication message sent by the remote terminal device over the first cellular direct link, or receiving a first preset random access preamble message sent by the remote terminal device, or receiving a second indication message sent by the relay terminal device over the second cellular direct link, where the first indication message, the first preset random access preamble message, or the second indication message is used to indicate that the terminal-to-terminal direct link fails; and acquiring, by the base station based on the received first indication message, first preset random access preamble message, or second indication message, that the relay link fails.

By performing the foregoing steps, the base station may acquire, based on the message reported by the remote terminal device or the relay terminal device, of the event that the terminal-to-terminal direct link between the remote terminal device and the relay terminal device fails, so as to perform corresponding processing on the failed link in a timely manner, thereby ensuring normal communication of the remote terminal device.

With reference to the first aspect, in a second implementation of the first aspect, before the sending, by the base station, a first reconfiguration message to the remote terminal device, the method further includes:

receiving, by the base station, a third indication message sent by the remote terminal device over the first cellular direct link, or receiving a second preset random access preamble message sent by the remote terminal device, or receiving a first radio resource control (English: Radio Resource Control, RRC) reestablishment request message sent by the relay terminal device, where the third indication message, the second preset random access preamble message, or the first RRC reestablishment request message is used to indicate that the second cellular direct link fails; and acquiring, by the base station based on the third indication message, the second preset random access preamble message, or the first RRC reestablishment request message, that the relay link fails.

By performing the foregoing steps, the base station may acquire, based on the message reported by the remote terminal device or the relay terminal device, of the event that the second cellular direct link between the relay terminal device and the base station fails, so as to perform corresponding processing on the failed link in a timely manner, thereby ensuring normal communication of the remote terminal device.

With reference to the first aspect or any implementation of the first aspect, in a third implementation of the first aspect, the first reconfiguration message includes parameter information of each protocol layer of a cellular radio bearer RB of the remote terminal device or includes an identifier of the relay link that needs to be deleted, and the second reconfiguration message includes the identifier of the relay link that needs to be deleted or includes an identifier of the remote terminal device.

According to a second aspect, a radio link failure handling method is provided, including:

when a relay link between a base station and remote terminal device fails and a first cellular direct link between the base station and the remote terminal device is normal, switching, by the remote terminal device, a transmission path of a communication service from the relay link to the first cellular direct link based on a first reconfiguration message sent by the base station, where the relay link includes a terminal-to-terminal direct link between the remote terminal device and relay terminal device and a second cellular direct link between the relay terminal device and the base station, and the failure of the relay link includes at least one of a failure of the terminal-to-terminal direct link and a failure of the second cellular direct link.

By performing the foregoing steps, when the relay link between the remote terminal device and the base station fails, the remote terminal device switches a communication link, and the remote terminal device does not use the relay link to communicate with the base station but uses the cellular direct link to communicate with the base station, thereby ensuring normal operation of the service and avoiding communication interruption.

With reference to the second aspect, in a first implementation of the second aspect, before the switching, by the remote terminal device, a transmission path of a communication service from the relay link to the first cellular direct link based on a first reconfiguration message sent by the base station, the method further includes:

when acquiring that the terminal-to-terminal direct link fails, sending, by the remote terminal device, a first indication message to the base station over the first cellular direct link, or sending a first preset random access preamble message to the base station, where the first indication message or the first preset random access preamble message is used to indicate that the terminal-to-terminal direct link fails; and receiving, by the remote terminal device, the first reconfiguration message sent by the base station.

By performing the foregoing steps, the remote terminal device may report, to the base station, the event that the terminal-to-terminal direct link between the remote terminal device and the relay terminal device fails, so that the base station can perform corresponding processing on the failed link in a timely manner, thereby ensuring normal communication of the remote terminal device.

With reference to the second aspect, in a second implementation of the second aspect, before the switching, by the remote terminal device, a transmission path of a communication service from the relay link to the first cellular direct link based on a first reconfiguration message sent by the base station, the method further includes:

when acquiring that the second cellular direct link fails, sending, by the remote terminal device, a third indication message to the base station over the first cellular direct link, or sending a second preset random access preamble message to the base station, where the third indication message or the second preset random access preamble message is used to indicate that the second cellular direct link fails; and receiving, by the remote terminal device, the first reconfiguration message sent by the base station.

By performing the foregoing steps, the remote terminal device may report, to the base station, the event that the second cellular direct link between the relay terminal device and the base station fails, so that the base station can perform corresponding processing on the failed link in a timely manner, thereby ensuring normal communication of the remote terminal device.

With reference to the second implementation of the second aspect, in a third implementation of the second aspect, before the sending a third indication message to the base station over the first cellular direct link, the method further includes:

receiving, by the remote terminal device, a fourth indication message sent by the relay terminal device, where the fourth indication message is used to indicate that the second cellular direct link fails; and acquiring, by the remote terminal device based on the fourth indication message, that the second cellular direct link fails.

By performing the foregoing steps, the relay terminal device may notify the remote terminal device of the event that the second cellular direct link fails, and the remote terminal device reports, to the base station, the event that the second cellular direct link between the relay terminal device and the base station fails, so that the base station can perform corresponding processing on the failed link in a timely manner, thereby ensuring normal communication of the remote terminal device.

With reference to the second aspect or any implementation of the second aspect, in a fourth implementation of the second aspect, the switching, by the remote terminal device, a transmission path of a communication service from the relay link to the first cellular direct link based on a first reconfiguration message sent by the base station includes:

when a cellular radio bearer RB of the remote terminal device is carried on only the relay link, reestablishing, by the remote terminal device, a protocol layer of the cellular RB based on parameter information of each protocol layer of the cellular RB that is carried in the first reconfiguration message, and switching a transmission path of the cellular RB from the relay link to the first cellular direct link; or when a cellular radio bearer RB of the remote terminal device is not carried on only the relay link, deleting, by the remote terminal device, link configuration information and/or a buffered data packet that are/is corresponding to the relay link based on an identifier of the relay link that is carried in the first reconfiguration message, and switching a transmission path of the cellular RB from the relay link to the first cellular direct link.

According to a third aspect, a radio link failure handling method is provided, including:

when a relay link between a base station and remote terminal device fails and a first cellular direct link between the base station and the remote terminal device is normal, deleting, by relay terminal device, link related information corresponding to the remote terminal device based on a second reconfiguration message sent by the base station, where the relay link includes a terminal-to-terminal direct link between the remote terminal device and the relay terminal device and a second cellular direct link between the relay terminal device and the base station, and the failure of the relay link includes at least one of a failure of the terminal-to-terminal direct link and a failure of the second cellular direct link.

By performing the foregoing operations, after the relay link between the remote terminal device and the base station fails, the relay terminal device deletes link configuration information and/or a buffered data packet that are/is corresponding to the remote terminal device, so as to release corresponding resources and reduce resource occupation.

With reference to the third aspect, in a first implementation of the third aspect, before the deleting, by relay terminal device, link related information corresponding to the remote terminal device based on a second reconfiguration message sent by the base station, the method further includes:

when acquiring that the terminal-to-terminal direct link fails, sending, by the relay terminal device, a second indication message to the base station over the second cellular direct link, where the second indication message is used to indicate that the terminal-to-terminal direct link fails; and receiving, by the relay terminal device, the second reconfiguration message sent by the base station.

By performing the foregoing operations, the relay terminal device may report, to the base station, the event that the terminal-to-terminal direct link between the remote terminal device and the relay terminal device fails, so that the base station can perform corresponding processing on the failed link in a timely manner, thereby ensuring normal communication of the remote terminal device.

With reference to the third aspect, in a second implementation of the third aspect, before the deleting, by relay terminal device, link related information corresponding to the remote terminal device based on a second reconfiguration message sent by the base station, the method further includes:

sending, by the relay terminal device, a first radio resource control RRC reestablishment request message to the base station when acquiring that the second cellular direct link fails, where the first RRC reestablishment request message is used to indicate that the second cellular direct link fails;

receiving, by the relay terminal device, an RRC reestablishment rejection message sent by the base station, where the RRC reestablishment rejection message includes the second reconfiguration message; and obtaining, by the relay terminal device, the second reconfiguration message from the RRC reestablishment rejection message.

By performing the foregoing operations, the relay terminal device may report, to the base station, the event that the second cellular direct link between the relay terminal device and the base station fails, so that the base station can perform corresponding processing on the failed link in a timely manner, thereby ensuring normal communication of the remote terminal device.

With reference to the third aspect or any implementation of the third aspect, in a third implementation of the third aspect, the deleting, by relay terminal device, link related information corresponding to the remote terminal device based on a second reconfiguration message sent by the base station includes:

when a relay radio bearer RB on the second cellular direct link is allocated to only the remote terminal device, deleting, by the relay terminal device, the relay RB, and configuration information and/or a buffered data packet that are/is corresponding to the relay RB based on an identifier of the relay link that is carried in the second reconfiguration message sent by the base station; or when a relay radio bearer RB on the second cellular direct link is not allocated to only the remote terminal device, deleting, by the relay terminal device, configuration information and/or a buffered data packet that are/is in the relay RB and corresponding to the remote terminal device based on an identifier of the remote terminal device that is carried in the second reconfiguration message sent by the base station.

According to a fourth aspect, a radio link failure handling method is provided, including:

when a base station acquires that a first cellular direct link between the base station and remote terminal device fails and a relay link between the base station and the remote terminal device is normal, sending, by the base station, a third reconfiguration message to the remote terminal device, or sending a fourth reconfiguration message to relay terminal device; or when a base station acquires that a first cellular direct link between the base station and remote terminal device fails and a relay link between the base station and the remote terminal device is normal, sending, by the base station, a fifth reconfiguration message to the remote terminal device, or sending a sixth reconfiguration message to relay terminal device, where the relay link includes a terminal-to-terminal direct link between the remote terminal device and the relay terminal device and a second cellular direct link between the relay terminal device and the base station, the third reconfiguration message is used to instruct the remote terminal device to delete link configuration information and/or a buffered data packet that are/is corresponding to the relay link, the fourth reconfiguration message is used to instruct the relay terminal device to delete link related information corresponding to the remote terminal device, the fifth reconfiguration message is used to instruct the remote terminal device to switch a transmission path of a communication service from the first cellular direct link to the relay link, and the sixth reconfiguration message is used to instruct the relay terminal device to switch a transmission path of a communication service of the remote terminal device from the first cellular direct link to the relay link.

By performing the foregoing operations, after the first cellular direct link between the remote terminal device and the base station fails, the base station instructs the relay terminal device to delete link configuration information and/or a buffered data packet that are/is corresponding to the remote terminal device, so as to release corresponding resources and reduce resource occupation, and the base station instructs the remote terminal device to delete the link configuration information and/or the buffered data packet that are/is corresponding to the relay link, so as to release corresponding resources and reduce resource occupation.

Alternatively, after the first cellular direct link between the remote terminal device and the base station fails, the base station instructs the relay terminal device to switch the transmission path of the communication service of the remote terminal device to the relay link, so as to ensure normal communication of the remote terminal device, and instructs the remote terminal device to no longer use the first cellular direct link to communicate with the base station but use the relay link to communicate with the base station, thereby ensuring normal operation of the service and avoiding communication interruption.

With reference to the fourth aspect, in a first implementation of the fourth aspect, before the sending, by the base station, a third reconfiguration message to the remote terminal device, or before the sending a fourth reconfiguration message to relay terminal device, or before the sending, by the base station, a fifth reconfiguration message to the remote terminal device, or before the sending a sixth reconfiguration message to relay terminal device, the method further includes:

receiving, by the base station, a fifth indication message sent by the remote terminal device over the relay link, or receiving a third preset random access preamble message sent by the remote terminal device, or receiving a second radio resource control RRC reestablishment request message sent by the remote terminal device, or receiving a sixth indication message sent by the relay terminal device over the second cellular direct link, where the fifth indication message, the third preset random access preamble message, or the sixth indication message is used to indicate that the first cellular direct link fails; and acquiring, by the base station based on the fifth indication message, the third preset random access preamble message, the second RRC reestablishment request message, or the sixth indication message, that the first cellular direct link fails.

By performing the foregoing operations, the base station may acquire, based on the message reported by the remote terminal device or the relay terminal device, of the event that the first cellular direct link between the remote terminal device and the base station fails, so as to perform corresponding processing on the failed link in a timely manner, thereby ensuring normal communication of the remote terminal device.

With reference to the fourth aspect or the first implementation of the fourth aspect, in a second implementation of the fourth aspect, the third reconfiguration message includes an identifier of the relay link, the fourth reconfiguration message includes an identifier of the relay link that needs to be deleted or includes an identifier of the remote terminal device, the fifth reconfiguration message includes an identifier of the relay link, and the sixth reconfiguration message includes parameter information of each protocol layer of a cellular radio bearer RB of the remote terminal device.

According to a fifth aspect, a radio link failure handling method is provided, including:

when a first cellular direct link between remote terminal device and a base station fails and a relay link between the base station and the remote terminal device is normal, deleting, by the remote terminal device, link configuration information and/or a buffered data packet that are/is corresponding to the relay link based on a third reconfiguration message sent by the base station; or when a first cellular direct link between remote terminal device and a base station fails and a relay link between the base station and the remote terminal device is normal, switching, by the remote terminal device, a transmission path of a communication service from the first cellular direct link to the relay link; or when a first cellular direct link between remote terminal device and a base station fails and a relay link between the base station and the remote terminal device is normal, switching, by the remote terminal device, a transmission path of a communication service from the first cellular direct link to the relay link based on a fifth reconfiguration message sent by the base station, where the relay link includes a terminal-to-terminal direct link between the remote terminal device and the relay terminal device and a second cellular direct link between the relay terminal device and the base station.

By performing the foregoing operations, after the first cellular direct link between the remote terminal device and the base station fails, the remote terminal device deletes the link configuration information and/or the buffered data packet that are/is corresponding to the relay link, so as to release corresponding resources and reduce resource occupation. Alternatively, the remote terminal device switches a communication link, and does not use the first cellular direct link to communicate with the base station but uses the relay link to communicate with the base station, thereby ensuring normal operation of the service and avoiding communication interruption.

With reference to the fifth aspect, in a first implementation of the fifth aspect, before the deleting, by the remote terminal device, link configuration information and/or a buffered data packet that are/is corresponding to the relay link based on a third reconfiguration message sent by the base station, the method further includes:

when acquiring that the first cellular direct link fails, sending, by the remote terminal device, a fifth indication message to the base station over the relay link, or sending a third preset random access preamble message to the base station, or sending a second radio resource control RRC reestablishment request message to the base station, where the fifth indication message, the third preset random access preamble message, or the second RRC reestablishment request message is used to indicate that the first cellular direct link fails; and receiving, by the remote terminal device, the third reconfiguration message sent by the base station; or before the switching, by the remote terminal device, a transmission path of a communication service from the first cellular direct link to the relay link based on a fifth reconfiguration message sent by the base station, the method further includes:

when acquiring that the first cellular direct link fails, sending, by the remote terminal device, a fifth indication message to the base station over the relay link, or sending a third preset random access preamble message to the base station, or sending a second radio resource control RRC reestablishment request message to the base station, where the fifth indication message, the third preset random access preamble message, or the second RRC reestablishment request message is used to indicate that the first cellular direct link fails; and receiving, by the remote terminal device, the fifth reconfiguration message sent by the base station.

By performing the foregoing operations, the remote terminal device may report, to the base station, the event that the first cellular direct link between the remote terminal device and the base station fails, so that the base station can perform corresponding processing on the failed link in a timely manner, thereby ensuring normal communication of the remote terminal device.

With reference to the fifth aspect or the first implementation of the fifth aspect, in a second implementation of the fifth aspect, the deleting, by the remote terminal device, link configuration information and/or a buffered data packet that are/is corresponding to the relay link based on a third reconfiguration message sent by the base station includes:

deleting, by the remote terminal device, the link configuration information and/or the buffered data packet that are/is corresponding to the relay link based on an identifier of the relay link that is carried in the third reconfiguration message sent by the base station.

According to a sixth aspect, a radio link failure handling method is provided, including:

when a first cellular direct link between remote terminal device and a base station fails and a relay link between the base station and the remote terminal device is normal, deleting, by relay terminal device, link related information corresponding to the remote terminal device based on a fourth reconfiguration message sent by the base station; or when a first cellular direct link between remote terminal device and a base station fails and a relay link between the base station and the remote terminal device is normal, switching, by the relay terminal device, a transmission path of a communication service of the remote terminal device from the first cellular direct link to the relay link based on a sixth reconfiguration message sent by the base station, where the relay link includes a terminal-to-terminal direct link between the remote terminal device and the relay terminal device and a second cellular direct link between the relay terminal device and the base station.

By performing the foregoing operations, after the first cellular direct link between the remote terminal device and the base station fails, the relay terminal device deletes link configuration information and/or a buffered data packet that are/is corresponding to the remote terminal device, so as to release corresponding resources and reduce resource occupation. Alternatively, after the first cellular direct link between the remote terminal device and the base station fails, the relay terminal device switches the transmission path of the communication service of the remote terminal device to the relay link, so as to ensure normal communication of the remote terminal device.

With reference to the sixth aspect, in a first implementation of the sixth aspect, before the deleting, by relay terminal device, link related information corresponding to the remote terminal device based on a fourth reconfiguration message sent by the base station, the method further includes:

when the relay terminal device acquires that the first cellular direct link between the base station and the remote terminal device fails, sending, by the relay terminal device, a sixth indication message to the base station over the second cellular direct link, where the sixth indication message is used to indicate that the first cellular direct link fails; and receiving, by the relay terminal device, the fourth reconfiguration message sent by the base station; or before the switching, by the relay terminal device, a transmission path of a communication service of the remote terminal device from the first cellular direct link to the relay link based on a sixth reconfiguration message sent by the base station, the method further includes:

when the relay terminal device acquires that the first cellular direct link between the base station and the remote terminal device fails, sending, by the relay terminal device, a sixth indication message to the base station over the second cellular direct link, where the sixth indication message is used to indicate that the first cellular direct link fails; and receiving, by the relay terminal device, the sixth reconfiguration message sent by the base station.

By performing the foregoing operations, the relay terminal device may report, to the base station, the event that the first cellular direct link between the remote terminal device and the base station fails, so that the base station can perform corresponding processing on the failed link in a timely manner, thereby ensuring normal communication of the remote terminal device.

With reference to the sixth aspect or the first implementation of the sixth aspect, in a second implementation of the sixth aspect, the deleting, by relay terminal device, link related information corresponding to the remote terminal device based on a fourth reconfiguration message sent by the base station includes:

when a relay radio bearer RB on the second cellular direct link is allocated to only the remote terminal device, deleting, by the relay terminal device, the relay RB entity, and configuration information and/or a buffered data packet that are/is corresponding to the relay RB based on an identifier of the relay link that is carried in the fourth reconfiguration message sent by the base station; or when a relay radio bearer RB on the second cellular direct link is not allocated to only the remote terminal device, deleting, by the relay terminal device, configuration information and/or a buffered data packet that are/is in the relay RB entity and corresponding to the remote terminal device based on an identifier of the remote terminal device that is carried in the fourth reconfiguration message sent by the base station.

With reference to the sixth aspect or the first implementation of the sixth aspect, in a third implementation of the sixth aspect, the switching, by the relay terminal device, a transmission path of a communication service of the remote terminal device from the first cellular direct link to the relay link based on a sixth reconfiguration message sent by the base station includes:

reconfiguring, by the relay terminal device, a protocol layer corresponding to the remote terminal device based on reconfiguration information corresponding to a cellular RB of the remote terminal device that is carried in the sixth reconfiguration message sent by the base station, and switching the transmission path of the communication service of the remote terminal device from the first cellular direct link to the relay link.

According to a seventh aspect, an embodiment of this application provides an apparatus for handling a radio link failure. The apparatus has a function for implementing actions of the network device in the foregoing method designs. The function may be implemented by hardware, or may be implemented by corresponding software executed by hardware. The hardware or software includes one or more modules corresponding to the foregoing function.

In a possible design, a structure of the apparatus includes a processor and a transmitter, where the processor is configured to support the network device in performing corresponding functions in the foregoing method, and the transmitter is configured to send a first reconfiguration message to the remote terminal device and send a second reconfiguration message to relay terminal device. The network device may further include a memory. The memory is coupled with the processor. The memory stores a program instruction and data required by the network device.

According to an eighth aspect, an embodiment of this application provides an apparatus for handling a radio link failure, where the apparatus has a function for implementing actions of the terminal device in the foregoing method designs. The function may be implemented by hardware, or may be implemented by corresponding software executed by hardware. The hardware or software includes one or more modules corresponding to the foregoing function.

In a possible design, a structure of the terminal device includes a processor, where the processor is configured to: switch a transmission path of a communication service from the relay link to the first cellular direct link based on a first reconfiguration message sent by the base station.

According to a ninth aspect, an embodiment of this application provides an apparatus for handling a radio link failure, where the apparatus has a function for implementing actions of the relay terminal device in the foregoing method designs. The function may be implemented by hardware, or may be implemented by corresponding software executed by hardware. The hardware or software includes one or more modules corresponding to the foregoing function.

In a possible design, a structure of the relay terminal device includes a processor, configure to, when a relay link between a base station and remote terminal device fails and a first cellular direct link between the base station and the remote terminal device is normal, delete link related information corresponding to the remote terminal device based on a second reconfiguration message sent by the base station.

According to a tenth aspect, an embodiment of this application provides an apparatus for handling a radio link failure. The apparatus has a function for implementing actions of the network device in the foregoing method designs. The function may be implemented by hardware, or may be implemented by corresponding software executed by hardware. The hardware or software includes one or more modules corresponding to the foregoing function.

In a possible design, a structure of the apparatus includes a processor and a transmitter, where the processor is configured to support the network device in performing corresponding functions in the foregoing method, and the transmitter is configured to send third reconfiguration message to the remote terminal device, or send a fourth reconfiguration message to relay terminal device; or when a base station acquires that a first cellular direct link between the base station and remote terminal device fails and a relay link between the base station and the remote terminal device is normal, send a fifth reconfiguration message to the remote terminal device, or send a sixth reconfiguration message to relay terminal device. The network device may further include a memory. The memory is coupled with the processor. The memory stores a program instruction and data required by the network device.

According to an eleventh aspect, an embodiment of this application provides an apparatus for handling a radio link failure, where the apparatus has a function for implementing actions of the romate terminal device in the foregoing method designs. The function may be implemented by hardware, or may be implemented by corresponding software executed by hardware. The hardware or software includes one or more modules corresponding to the foregoing function.

In a possible design, a structure of the romate terminal device includes a processor, where the processor is configured to: when a first cellular direct link between remote terminal device and a base station fails and a relay link between the base station and the remote terminal device is normal, delete link related information corresponding to the remote terminal device based on a fourth reconfiguration message sent by the base station; or when a first cellular direct link between remote terminal device and a base station fails and a relay link between the base station and the remote terminal device is normal, switch a transmission path of a communication service of the remote terminal device from the first cellular direct link to the relay link based on a sixth reconfiguration message sent by the base station.

According to a twelfth aspect, an embodiment of this application provides an apparatus for handling a radio link failure, where the apparatus has a function for implementing actions of the relay terminal device in the foregoing method designs. The function may be implemented by hardware, or may be implemented by corresponding software executed by hardware. The hardware or software includes one or more modules corresponding to the foregoing function.

In a possible design, a structure of the relay terminal device includes a processor, configure to, when a first cellular direct link between remote terminal device and a base station fails and a relay link between the base station and the remote terminal device is normal, the processor deletes link related information corresponding to the remote terminal device based on a fourth reconfiguration message sent by the base station; or when a first cellular direct link between remote terminal device and a base station fails and a relay link between the base station and the remote terminal device is normal, the processor switches a transmission path of a communication service of the remote terminal device from the first cellular direct link to the relay link based on a sixth reconfiguration message sent by the base station.

According to a thirteenth aspect, a base station is provided, and the base station includes a module or a unit configured to perform the radio link failure handling method according to the first aspect.

According to a fourteenth aspect, remote terminal device is provided, and the remote terminal device includes a module or a unit configured to perform the radio link failure handling method according to the second aspect.

According to a fifteenth aspect, relay terminal device is provided, and the relay terminal device includes a module or a unit configured to perform the radio link failure handling method according to the third aspect.

According to a sixteenth aspect, a base station is provided, and the base station includes a module or a unit configured to perform the radio link failure handling method according to the fourth aspect.

According to a seventeenth aspect, remote terminal device is provided, and the remote terminal device includes a module or a unit configured to perform the radio link failure handling method according to the fifth aspect.

According to an eighteenth aspect, relay terminal device is provided, and the relay terminal device includes a module or a unit configured to perform the radio link failure handling method according to the sixth aspect.

According to a nineteenth aspect, a communications system is provided, and the communications system includes a base station, remote terminal device, and relay terminal device, where the base station is the base station according to the seventh aspect or the thirteenth aspect, the remote terminal device is the remote terminal device according to the eighth aspect or the fourteenth aspect, and the relay terminal device is the relay terminal device according to the ninth aspect or the fifteenth aspect.

According to a twentieth aspect, a communications system is provided, and the communications system includes a base station, remote terminal device, and relay terminal device, where the base station is the base station according to the tenth aspect or the sixteenth aspect, the remote terminal device is the remote terminal device according to the eleventh aspect or the seventeenth aspect, and the relay terminal device is the relay terminal device according to the twelfth aspect or the eighteenth aspect.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention.

DESCRIPTION OF EMBODIMENTS

Figure 1:
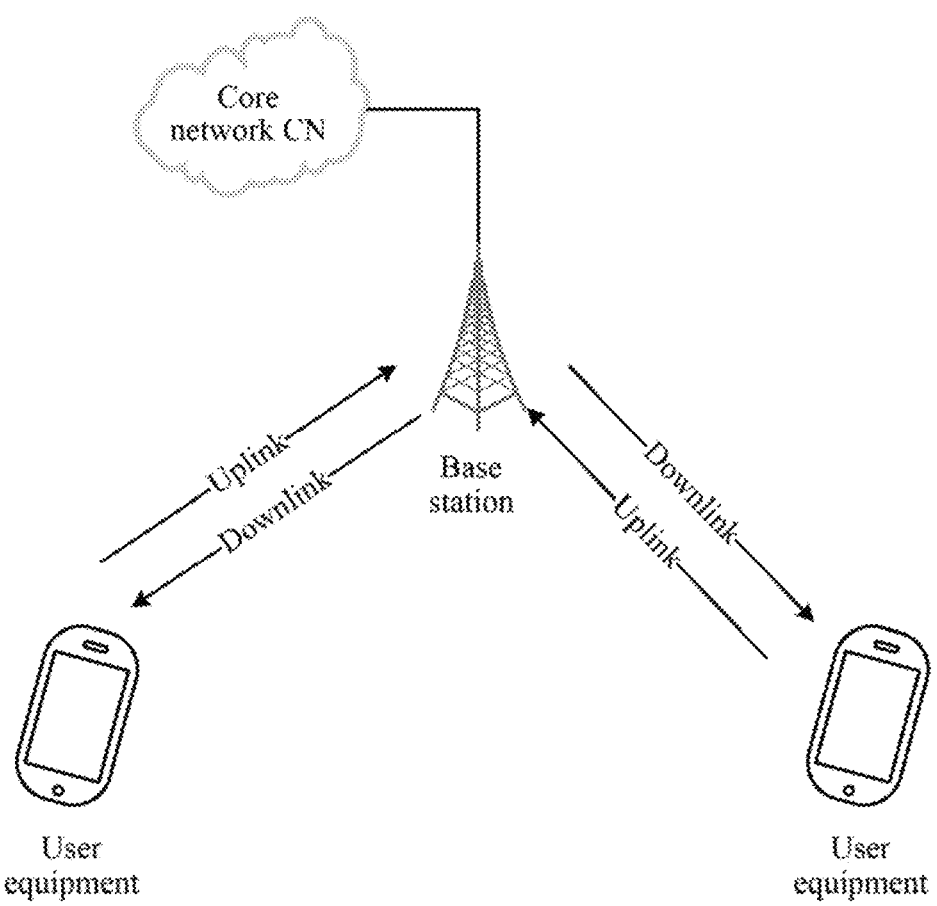
FIG. 1 is a schematic diagram of a centralized network control manner according to the prior art.
Figure 2:
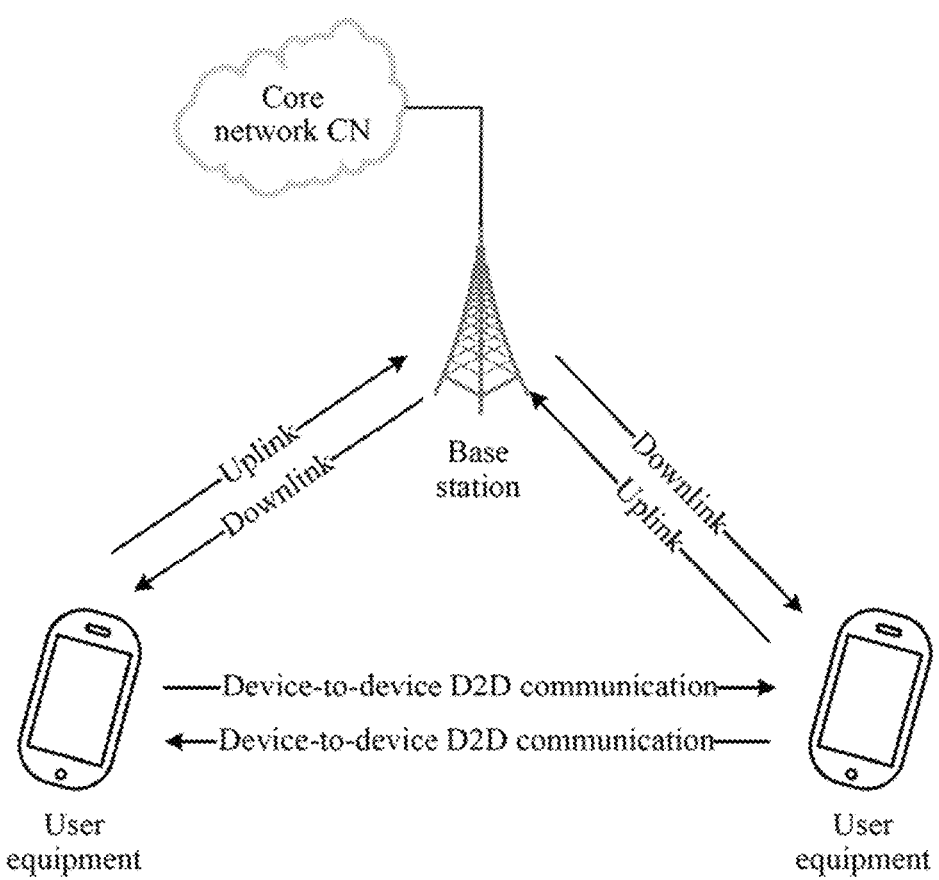
FIG. 2 is a schematic diagram of a device-to-device communication mode in the prior art.
Figure 3:
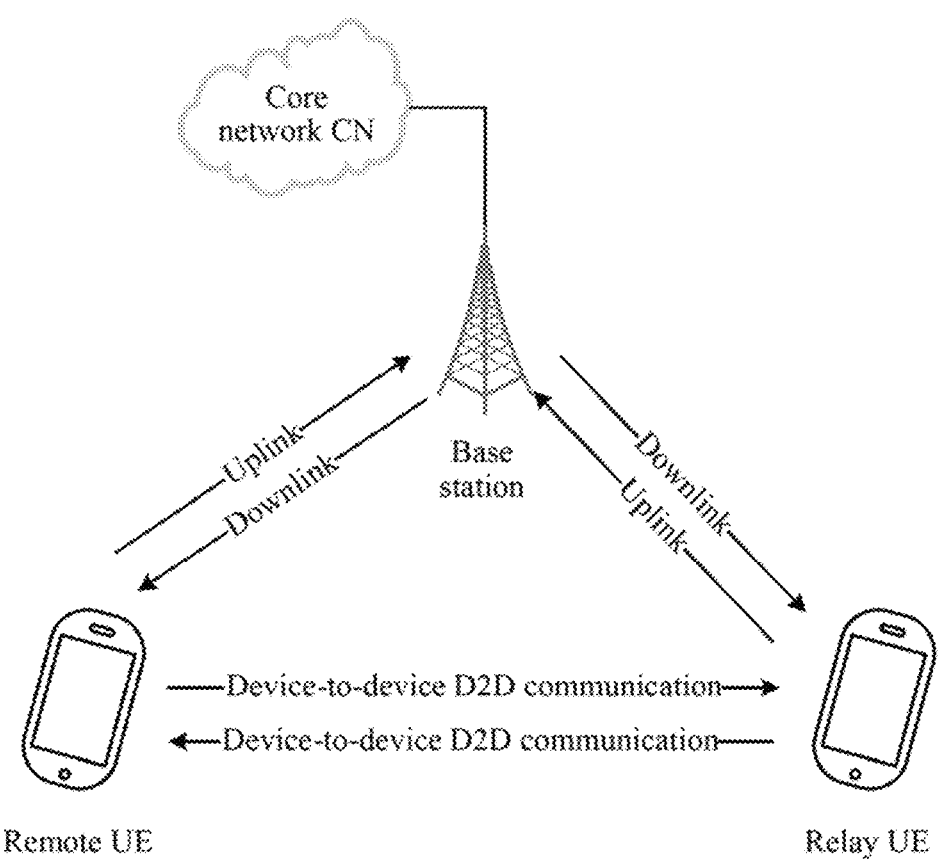
FIG. 3 is a schematic architectural diagram of a communications system related to the embodiments of the present invention.

FIG. 3 is a schematic architectural diagram of a communications system related to the embodiments of the present invention. The communications system includes remote terminal device, relay terminal device, and a base station.

The relay terminal device and the base station are wirelessly connected by using an air interface technology. The air interface technology may include existing 2G (for example, a Global System for Mobile Communications (GSM)), 3G (for example, a Universal Mobile Telecommunications System (UMTS), Wideband Code Division Multiple Access (WCDMA), and Time Division-Synchronous Code Division Multiple Access (TD-SCDMA)), and 4G (for example, FDD LTE and TDD LTE), and a future 4.5G system, 5G system, and the like.

The remote terminal device is terminal device that is not directly connected to the base station wirelessly, but is connected to the base station by using relay terminal device. The relay terminal device is directly connected to the base station wirelessly. The remote terminal device and the relay terminal device may be connected by using a terminal-to-terminal direct link (including a D2D link, a Wireless Fidelity (WI-FI) link, a BLUETOOTH Low Energy (BLE) link, a ZIGBEE link, and the like). In the embodiments of the present invention, the remote terminal device further has a cellular module in addition to a terminal-to-terminal direct module (including a D2D module, a WI-FI module, a BLE module, a ZIGBEE module, and the like). The remote terminal device may have both a relay link on which the remote terminal device indirectly communicates with the base station by using the relay terminal device and a cellular direct link on which the remote terminal device directly communicates with the base station, so as to transmit uplink or downlink data. The relay link includes two parts. One part is the terminal-to-terminal direct link (including a D2D link, a WI-FI link, a BLE link, and the like) between the remote terminal device and the relay terminal device, and the other part is a cellular direct link between the relay terminal device and the base station. It should be noted that, for distinguishing, in the following embodiments, the cellular direct link between the remote terminal device and the base station is referred to as a first cellular direct link, and the cellular direct link between the relay terminal device and the base station is referred to as a second cellular direct link. The remote terminal device may include but is not limited to a smartphone (such as an Android mobile phone or an iOS mobile phone), a tablet computer, a palmtop computer, a notebook computer, a mobile Internet device (MID), a wearable device (such as a smartwatch or a smart band), and the like. The remote terminal device may alternatively be a station (ST) in a wireless local area network (WLAN).

The base station may be a device configured to communicate with terminal device. The base station may be a BTS (BTS) in GSM or CDMA, or may be an NB (NodeB) in WCDMA, or may be an evolved NodeB (eNB) in Long Term Evolution (English: Long Term Evolution, LTE), an access network device in a future 5G network, an access network device in a future evolved public land mobile network (PLMN), or the like.

The relay terminal device may be a mobile console, an access terminal, a subscriber unit, a subscriber station, a mobile station, a remote station, a remote terminal, a mobile device, a user terminal, a terminal, a wireless communications device, a user agent, a user apparatus, or the like. A terminal device may be a wireless access point (WAP) in a WLAN, a personal digital assistant (PDA), a handheld device having a wireless communication function, a computing device or another processing device connected to a wireless modem, an in-vehicle device, a wearable device, a mobile console in a future 5G network, a terminal device in a further evolved PLMN network, or the like.

It should be noted that an example in which the terminal-to-terminal direct link is a D2D link is used for description in the following embodiments. For the terminal-to-terminal direct link, a WI-FI link, a BLUETOOTH link, or a ZIGBEE link is also applicable.

Figure 4:
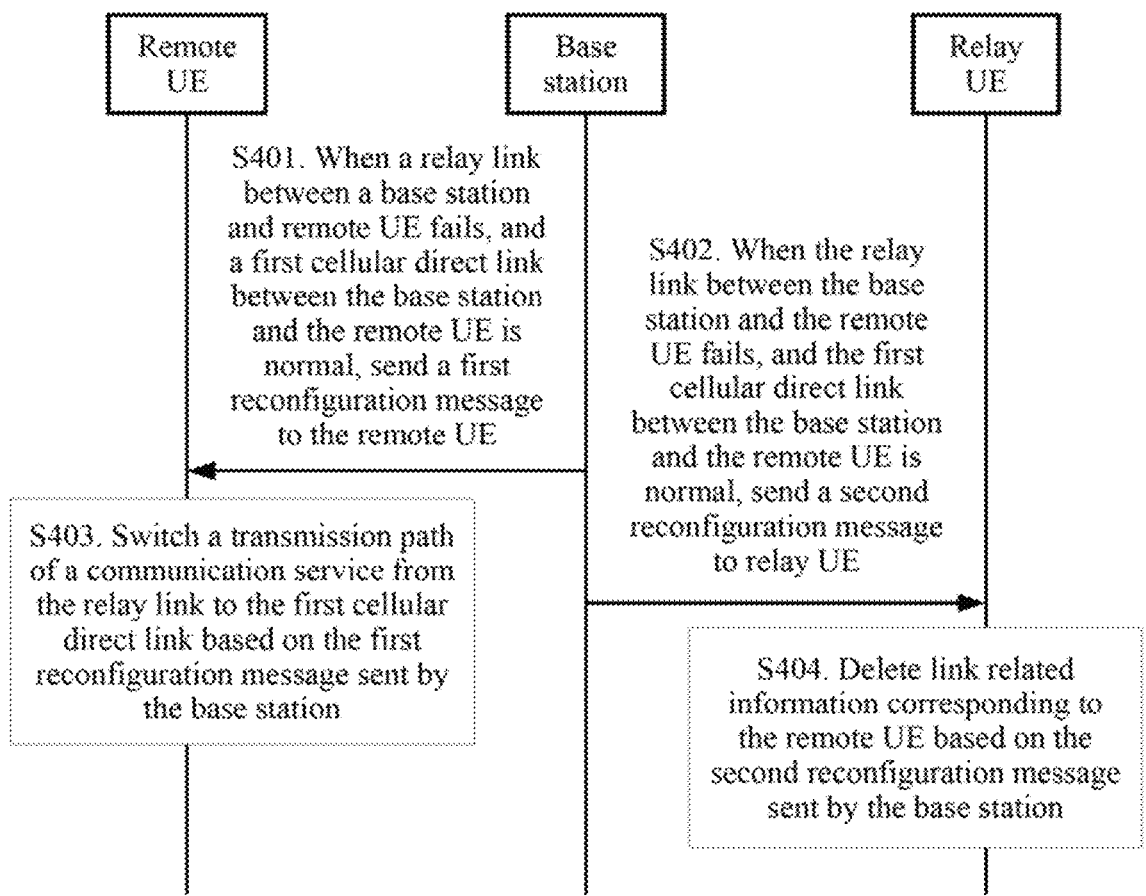
FIG. 4 is a schematic flowchart of a radio link failure handling method according to an embodiment of the present invention.

FIG. 4 is a schematic flowchart of a radio link failure handling method according to an embodiment of the present invention. A scenario in this embodiment is as follows: A relay link between remote terminal device and a base station fails, but a first cellular direct link between the remote terminal device and the base station is normal. That the relay link between the remote terminal device and the base station fails includes three cases: A first case is that a D2D link between the remote terminal device and relay terminal device fails; a second case is that a second cellular direct link between the relay terminal device and the base station fails; and a third case is that the D2D link between the remote terminal device and the relay terminal device fails, and the second cellular direct link between the relay terminal device and the base station fails. The method includes but is not limited to steps S401 to S404. Detailed descriptions of the steps are as follows:

S401. When a base station acquires that a relay link between the base station and remote terminal device fails and a first cellular direct link between the base station and the remote terminal device is normal, the base station sends a first reconfiguration message to the remote terminal device.

S402. When the base station acquires that the relay link between the base station and the remote terminal device fails, and the first cellular direct link between the base station and the remote terminal device is normal, the base station sends a second reconfiguration message to relay terminal device.

The first reconfiguration message is used to instruct the remote terminal device to switch a transmission path of a communication service from the relay link to the first cellular direct link, so that the remote terminal device uses the first cellular direct link to transmit services, thereby ensuring normal operation of the communication service of the remote terminal device. The second reconfiguration message is used to instruct the relay terminal device to delete link related information corresponding to the remote terminal device, to save system resources. The link related information herein includes but is not limited to link configuration information and/or a buffered data packet.

Optionally, the base station may detect a status of the relay link between the base station and the remote terminal device. For example, the base station may detect whether an uplink between the base station and the relay terminal device is normal, and if detecting that the uplink between the base station and the relay terminal device fails, the base station may determine that the relay link between the base station and the remote terminal device fails. Similarly, the base station may also detect whether the first cellular direct link between the base station and the remote terminal device is normal.

Optionally, the base station may further acquire, based on an indication message reported by the remote terminal device, that the relay link between the base station and the remote terminal device fails. Specifically, when the remote terminal device detects that the D2D link between the remote terminal device and the relay terminal device fails, the remote terminal device sends a first indication message to the base station. The first indication message is used to indicate that the D2D link between the remote terminal device and the relay terminal device fails. Alternatively, when the relay terminal device detects that a downlink between the relay terminal device and the base station fails, the relay terminal device sends a fourth indication message to the remote terminal device. The fourth indication message is used to indicate that the downlink between the relay terminal device and the base station fails. After receiving the fourth indication message, the remote terminal device may acquire that the downlink between the relay terminal device and the base station fails, and the remote terminal device sends, to the base station, a third indication message used to indicate that the downlink between the relay terminal device and the base station fails. When receiving the third indication message, the base station may acquire that the relay link between the base station and the remote terminal device fails.

A message name of the first indication message may be "D2D link failure indication". Information included in the first indication message includes at least an identifier (D2D link ID) of the failed D2D link or an identifier (relay terminal device ID) of the relay terminal device corresponding to the failed D2D link. The base station may acquire, based on the first indication message, that the D2D link between the remote terminal device and the relay terminal device fails. In other words, when the D2D link between the remote terminal device and the relay terminal device fails, the failure may be found and reported by the relay terminal device to the base station, or may be found and reported by the remote terminal device to the base station. This is not specifically limited in this embodiment of the present invention.

When the relay terminal device finds that the downlink between the relay terminal device and the base station fails, the relay terminal device sends, over the D2D link, the fourth indication message to the remote terminal device served by the relay terminal device, to notify the remote terminal device that the relay link fails. The fourth indication message may be a "relay UU failure" message, and the relay UU failure message carries at least the ID of the relay terminal device. After receiving the fourth indication message sent by the relay terminal device serving the remote terminal device, the remote terminal device sends the third indication message to the base station over the cellular direct link between the remote terminal device and the base station. The third indication message may be a "relay link failure indication" message, and the relay link failure indication message includes at least one or any combination of the identifier (namely, the relay terminal device ID) of the relay terminal device, an identifier (namely, a relay link ID) of the relay link, or an identifier (namely, a relay RB ID) of a relay RB. The base station may acquire, based on the relay terminal device ID, the relay link ID, or the relay RB ID, of the relay terminal device whose downlink fails.

Optionally, for a specific application scenario (that is, an application scenario in which uplink data or information of the remote terminal device is all sent to the base station over the relay link, and downlink data or information is sent to the remote terminal device all over the first cellular direct link, where in this application scenario, the base station allocates only a downlink transmission link to the remote terminal device and allocates no uplink transmission resource to the remote terminal device), when the remote terminal device detects that the D2D link between the remote terminal device and the relay terminal device fails, the remote terminal device may send a first preset random access preamble message to the base station. The first preset random access preamble message is used to indicate that the D2D link fails. When receiving the first preset random access preamble message, the base station may acquire that the relay link between the remote terminal device and the base station fails. Specifically, the remote terminal device needs to re-initiate a new RACH (random access) process, and in the access process, an existing LTE technology may be used to perform an RRC connection reestablishment process. Since the downlink between the remote terminal device and the base station can work normally, a difference between the RACH process and an RACH process of normal terminal device in LTE is as follows: (1) The remote terminal device already has a downlink resource, a C-RNTI, and the like but lacks an uplink resource, and therefore may send a special RACH preamble (preamble) to notify the eNB that the relay link of the remote terminal device fails and the remote terminal device needs to fall back to a cellular uplink to send data. The special RACH preamble is allocated by the eNB to the remote terminal device when the remote terminal device establishes a previous RRC link. (2) The eNB receives the special preamble, acquires that the D2D link of the corresponding remote terminal device fails, and then may determine that the relay link of the remote terminal device fails.

Optionally, for the foregoing specific application scenario, when the remote terminal device receives the fourth indication message sent by the relay terminal device, and acquires that the downlink between the remote terminal device and the base station fails, the remote terminal device may send a second preset random access preamble message to the base station. The second preset random access preamble message is used to indicate that the downlink between the relay terminal device and the base station fails. When receiving the second preset random access preamble message, the base station may acquire that the relay link between the remote terminal device and the base station fails. Specifically, the remote terminal device needs to re-initiate a new RACH (random access) process, and in the access process, an existing LTE technology may be used to perform an RRC connection reestablishment process. Since the downlink between the remote terminal device and the base station can work normally, a difference between the RACH process and an RACH process of normal terminal device in LTE is as follows: (1) The remote terminal device already has a downlink resource, a C-RNTI, and the like but lacks an uplink resource, and therefore may send a special RACH preamble (preamble) to notify the eNB that the relay link of the remote terminal device fails and the remote terminal device needs to fall back to a cellular uplink to send data. The special RACH preamble is allocated by the eNB to the remote terminal device when the remote terminal device establishes a previous RRC link. (2) The eNB receives the special preamble, acquires that the downlink between the relay terminal device and the base station fails, and then may determine that the relay link of the remote terminal device fails.

Optionally, the base station may further acquire, based on an indication message reported by the relay terminal device, that the relay link between the base station and the remote terminal device fails. Specifically, when the relay terminal device detects that the D2D link between the relay terminal device and the remote terminal device fails, the relay terminal device sends a second indication message to the base station. The second indication message is used to indicate that the D2D link between the relay terminal device and the remote terminal device fails. Alternatively, when the relay terminal device detects that a downlink between the relay terminal device and the base station fails, the relay terminal device sends a first RRC connection reestablishment request (English: RRC connection reestablishment request) message to the base station. The first RRC reestablishment request message is used to indicate that the downlink between the relay terminal device and the base station fails. When receiving the second indication message or the second RRC reestablishment request, the base station may acquire that the relay link between the base station and the remote terminal device fails.

A message name of the second indication message may be "D2D link failure indication". Information included in the second indication message includes at least an identifier (D2D link ID) of the failed D2D link or an identifier (remote terminal device ID) of the remote terminal device corresponding to the failed D2D link.

A method for detecting, by the relay terminal device, whether the D2D link between the relay terminal device and the remote terminal device fails is as follows: When the relay terminal device detects that link signal quality in a process of D2D communication between the relay terminal device and the remote terminal device is less than a threshold and this case lasts for a period of time, for example, the relay terminal device detects that reference signal received quality (English: Reference Signal Received Quality, RSRQ) of a D2D signal is less than −12 dB and this case lasts 1 s; or when the relay terminal device detects that a quantity of times of retransmission of a D2D data packet reaches a maximum value, for example, the quantity of times of retransmission reaches 4; or when the relay terminal device does not receive, within a specific period, data sent by the remote terminal device, for example, the relay terminal device does not receive, within 5s, data sent by the remote terminal device, it is considered that the D2D link fails.

The first RRC reestablishment request message carries at least the identifier (namely, the remote terminal device ID) of the remote terminal device that establishes a D2D connection to the relay terminal device or an identifier (namely, an RB ID) of a relay RB configured by the relay terminal device for the remote terminal device. Optionally, the first RRC reestablishment request message may further carry an identifier of another remote terminal device that has a D2D link with the relay terminal device.

Optionally, when the relay terminal device detects that the downlink between the relay terminal device and the base station fails, the relay terminal device sends the first RRC reestablishment request message to the base station according to an existing LTE rule, so as to reestablish an RRC connection to the base station; and in addition, the relay terminal device instructs, by using the D2D link, the remote terminal device to suspend D2D transmission. Specifically, when the relay terminal device detects that the downlink between the relay terminal device and the base station fails, the relay terminal device sends a D2D transmission suspension message to the remote terminal device, and the D2D transmission suspension message is used to instruct the remote terminal device to suspend D2D communication. Specifically, the D2D transmission suspension message may be a "suspend D2Ddata transmission" message, and the suspend D2Ddata transmission message may include a suspension cause value "UU link reestablishment".

It should be noted that the base station sends the second reconfiguration message to the relay terminal device if the process of reestablishing the RRC connection between the relay terminal device and the base station fails.

Optionally, the relay terminal device sends a D2D link release message to the remote terminal device if the process of reestablishing the RRC connection between the relay terminal device and the base station fails. The D2D link release message is used to instruct the remote terminal device to release the D2D link established between the remote terminal device and the relay terminal device. The D2D link release message may be information at a Media Access Control (English: Media Access Control, MAC) layer, for example, is carried in a packet header of a MAC PDU (Media Access Control protocol data unit), or may be a control layer message.

Specifically, the relay terminal device sends, to the remote terminal device over the D2D link, the D2D link release message used to instruct to release the D2D link, so as to instruct the remote terminal device to release the D2D link. The D2D link release message may carry a release cause value "UU link release".

Optionally, the relay terminal device sends a D2D link resume indication message to the remote terminal device if the process of reestablishing the RRC connection between the relay terminal device and the base station succeeds. The D2D link resume indication message is used to indicate that D2D communication is resumed.

Specifically, the relay terminal device sends, to the remote terminal device over the D2D link, the D2D link resume indication message used to indicate that D2D transmission is resumed, so as to notify the remote terminal device that D2D transmission is resumed. Optionally, the D2D link resume indication message may be a "resume D2Ddata transmission" message. The resume D2Ddata transmission message may include the identifier (namely, the D2D link ID) of the D2D link on which transmission is resumed, or an identifier list (namely, a D2D link list) of the D2D link on which transmission is resumed, so that the remote terminal device can acquire of the D2D link that recovers to normal, and it is ensured that D2D communication can be resumed in a timely manner. Alternatively, the D2D link resume indication message may be information at a MAC layer, for example, is carried in a packet header of a MAC PDU (Media Access Control protocol data unit), where the packet header carries at least one of an indicator indicating link resumption or the identifier of the D2D link.

Because the Uu link between the remote terminal device and the base station is normal, the base station sends the first reconfiguration message to the remote terminal device in a first cellular direct communication manner. When the base station determines that data (service) of a cellular radio bearer (English: Radio Bearer, RB) of the remote terminal device is carried on only the relay link established by using the relay terminal device, that is, the data of the cellular RB is transmitted over only the relay link of the relay terminal device, the first reconfiguration message includes configuration parameters of protocol layers (for example, a resource at a Radio Link Control (English: Radio Link Control, RLC) layer, a resource at a MAC layer, and a resource at a physical layer (English: Physical Layer, PHY)) of the cellular RB that need to be reconfigured. When the base station determines that data (service) of a cellular RB of the remote terminal device is not carried on only the relay link established by using the relay terminal device, it indicates that the cellular RB of the remote terminal device is further carried on the cellular direct link established between the remote terminal device and the base station, and therefore the first reconfiguration message includes instruction information used to instruct the remote terminal device to delete protocol layer link configuration information and/or a buffered data packet that are/is corresponding to the relay link. Further, the first reconfiguration message may further include the identifier of the relay link (including the D2D link between the remote terminal device and the relay terminal device and the cellular direct link between the relay terminal device and the base station). The remote terminal device may acquire, based on the identifier of the relay link, of the D2D link whose protocol layer configuration information and buffered data packet need to be deleted. Alternatively, the first reconfiguration message includes the identifier of the RB corresponding to the relay link, and the remote terminal device may acquire, based on the identifier of the RB corresponding to the relay link, of the D2D link whose protocol layer configuration information and buffered data packet need to be deleted. It should be noted that the cellular RB of the remote terminal device that is described in this embodiment of the present invention is a direct RB established between the remote terminal device and the base station.

When the base station determines that a relay RB of the relay terminal device is configured specifically for the remote terminal device for use, the second reconfiguration message needs to carry an identifier (namely, an RB ID) of the relay RB that is configured by the relay terminal device specifically for the remote terminal device. When the base station determines that a relay RB of the relay terminal device is allocated to a plurality of remote terminal devices and shared by the plurality of remote terminal devices, the second reconfiguration message carries the identifier (namely, the remote terminal device ID) of the remote terminal device, so as to enable the relay terminal device to delete only link configuration information and/or a buffered data packet that are/is corresponding to the remote terminal device. When the base station determines that a relay RB of the relay terminal device is shared by a plurality of remote terminal devices, the second reconfiguration message may carry no content, so as to enable the relay terminal device to delete link configuration information and/or buffered data packets corresponding to all remote terminal devices that have established D2D connections to the relay terminal device. It should be noted that the relay RB described in this embodiment of the present invention is an RB configured by the relay terminal device for transmitting data of the remote terminal device, and the relay RB existing between the base station and the relay terminal device is imperceptible in a network element of a core network.

S403. The remote terminal device switches a transmission path of communication service data from the relay link to the first cellular direct link based on the first reconfiguration message sent by the base station.

After receiving the first reconfiguration message, if the remote terminal device determines that the cellular RB of the remote terminal device is carried on only the relay link established by using the relay terminal device, the remote terminal device deletes link configuration information and a buffered data packet in each entity (for example, an L2CAP layer and the PHY layer) corresponding to the failed D2D link, and reconfigures each protocol layer entity of the cellular RB of the remote terminal device based on a configuration parameter carried in the first reconfiguration message, so that the remote terminal device does not use the relay link for communication, and transfer the communication service data of the remote terminal device to the cellular direct link between the remote terminal device and the base station. If the remote terminal device determines that the cellular RB of the remote terminal device is not carried on only the relay link established by using the relay terminal device, that is, service data of the cellular RB of the remote terminal device is transmitted over both the cellular direct link between the remote terminal device and the base station and the relay link, the remote terminal device needs to delete only link configuration information and a buffered data packet at each entity layer corresponding to the failed D2D link, and delete the identifier of the relay link from a transmission path list corresponding to the cellular RB, and the remote terminal device may continue to use the previously established first cellular direct link to communicate with the base station.

Optionally, after completing the foregoing reconfiguration process, the remote terminal device sends a first reconfiguration complete message to the base station. The first reconfiguration complete message is sent to notify the base station that the remote terminal device has completed the communication link switch process based on the first reconfiguration message.

S404. The relay terminal device deletes link related information corresponding to the remote terminal device based on the second reconfiguration message sent by the base station.

Specifically, when a relay RB of the relay terminal device is configured specifically for the remote terminal device for use, or when the second reconfiguration message carries only an RB ID, the relay terminal device deletes the relay RB and deletes link configuration information and/or a buffered data packet that are/is corresponding to the remote terminal device. The deleting link configuration information and/or a buffered data packet that are/is corresponding to the remote terminal device is specifically as follows: The relay terminal device deletes a data packet in an entity of a protocol stack corresponding to the remote terminal device, changes a variable in each protocol entity to an initial value, and resets a timer, so as to initialize a part that is in each protocol entity in the relay terminal device and that is corresponding to the remote terminal device. When a relay RB of the relay terminal device is allocated to a plurality of remote terminal devices and shared by the plurality of remote terminal devices, or when the second reconfiguration message carries only the identifier of the remote terminal device, the relay terminal device deletes only link configuration information and/or a buffered data packet that are/is at each entity layer of the relay terminal device and that are/is corresponding to the remote terminal device, and does not delete the relay RB, so as to ensure that the relay RB can continue to provide a relay communication capability for another remote terminal device. When the second reconfiguration message carries no content, the relay terminal device deletes link configuration information and buffered data packets corresponding to all remote terminal devices that have established D2D connections to the relay terminal device.

Optionally, after deleting the link configuration information and the buffered data packet that are corresponding to the remote terminal device, the relay terminal device sends a second reconfiguration complete message to the base station. The second reconfiguration complete message is sent to notify the base station that the relay terminal device has completed a corresponding reconfiguration process based on the second reconfiguration message.

By performing the foregoing steps, after the relay link between the remote terminal device and the base station fails, the base station instructs the relay terminal device to delete the link configuration information and/or the buffered data packet that are/is corresponding to the remote terminal device, so as to release corresponding resources and reduce resource occupation, and the base station instructs the remote terminal device to switch the communication link, to instruct the remote terminal device to no longer use the relay link to communicate with the base station but use the cellular direct link to communicate with the base station, thereby ensuring normal operation of the service and avoiding communication interruption.

Figure 5:
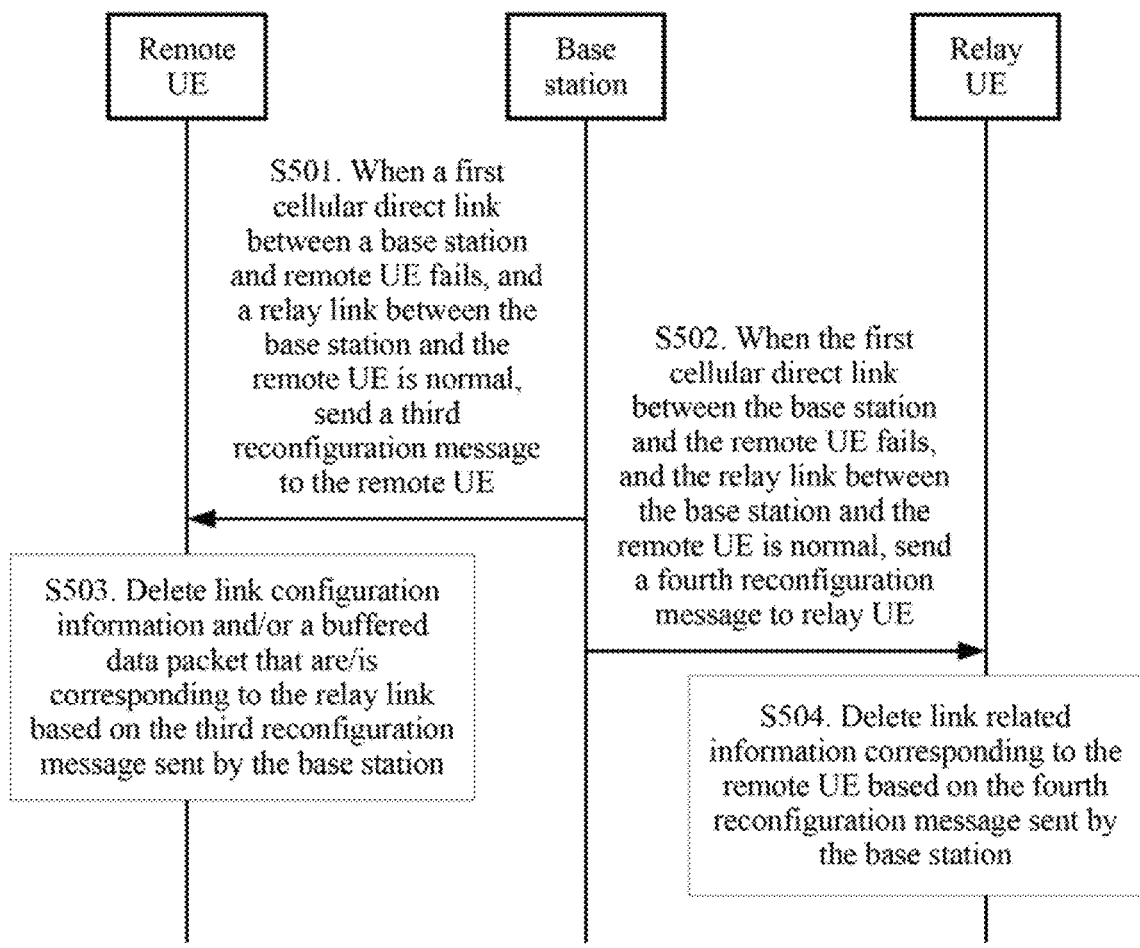
FIG. 5 is a schematic flowchart of another radio link failure handling method according to an embodiment of the present invention.

FIG. 5 is a schematic flowchart of another radio link failure handling method according to an embodiment of the present invention. A scenario in this embodiment is as follows: A relay link between remote terminal device and a base station is normal, but a first cellular direct link between the remote terminal device and the base station fails. The solution is based on the first cellular direct link. Once the first cellular direct link fails, the remote terminal device initiates a reestablishment process to delete related configurations of the relay link and the first cellular direct link, so as to save system resources. The method includes but is not limited to steps S501 to S504. Detailed descriptions of the steps are as follows:

S501. When a base station acquires that a first cellular direct link between the base station and remote terminal device fails and a relay link between the base station and the remote terminal device is normal, the base station sends a third reconfiguration message to the remote terminal device.

S502. When the base station acquires that the first cellular direct link between the base station and the remote terminal device fails and the relay link between the base station and the remote terminal device is normal, the base station sends a fourth reconfiguration message to relay terminal device.

It should be noted that when the base station acquires that the first cellular direct link between the base station and the remote terminal device fails and the relay link between the base station and the remote terminal device is normal, the base station may only send the third reconfiguration message to the remote terminal device and does not need to send the fourth reconfiguration message to the relay terminal device; or when the base station acquires that the first cellular direct link between the base station and the remote terminal device fails and the relay link between the base station and the remote terminal device is normal, the base station may only send the fourth reconfiguration message to the relay terminal device and does not need to send the third reconfiguration message to the remote terminal device. In this embodiment of the present invention, an example in which when the base station acquires that the first cellular direct link between the base station and the remote terminal device fails and the relay link between the base station and the remote terminal device is normal, the base station needs to send the third reconfiguration message to the remote terminal device and send the fourth reconfiguration message to the relay terminal device is used for description.

The third reconfiguration message is used to instruct the remote terminal device to delete link configuration information and/or a buffered data packet that are/is corresponding to the relay link, to save system resources. The fourth reconfiguration message is used to instruct the relay terminal device to delete link related information corresponding to the remote terminal device, to save system resources.

Optionally, the base station may detect whether the first cellular direct link between the base station and the remote terminal device is normal. For example, the base station may detect whether an uplink between the base station and the remote terminal device is normal, and if detecting that the uplink fails, the base station may determine that the first cellular direct link fails.

Optionally, the base station may further acquire, based on an indication message reported by the remote terminal device, that the first cellular direct link between the base station and the remote terminal device fails. Specifically, when the remote terminal device detects that a downlink between the remote terminal device and the base station fails, the remote terminal device sends a fifth indication message to the base station by using the relay terminal device. The fifth indication message is used to indicate that the first cellular direct link fails. Alternatively, when the remote terminal device detects that a downlink between the remote terminal device and the base station fails, the remote terminal device initiates an RRC reestablishment process, and the remote terminal device sends a second RRC connection reestablishment request message to the base station. The second RRC message is used to indicate that the first cellular direct link fails. Alternatively, for a specific application scenario (that is, an application scenario in which uplink data or information of the remote terminal device is all sent to the base station over the relay link, and downlink data or information is all sent to the remote terminal device over the first cellular direct link, where in this application scenario, the base station allocates only a downlink transmission link to the remote terminal device and allocates no uplink transmission resource to the remote terminal device), when the remote terminal device detects that a downlink between the remote terminal device and the base station fails, the remote terminal device initiates an RACH process, and sends a third preset random access preamble message to the base station. The third preset random access preamble message is used to indicate that the first cellular direct link fails. When receiving the fifth indication message, the second RRC message, or the third preset random access preamble message, the base station may acquire that the first cellular direct link fails.

The fifth indication message may further carry an identifier of the remote terminal device. Parameters carried in the second RRC reestablishment request message include a source cell ID of the remote terminal device and an ID of the relay terminal device.

When the base station storing context information of the remote terminal device receives the second RRC connection reestablishment request sent by the remote terminal device, the base station sends a third reconfiguration message to the remote terminal device. The message includes a parameter of the relay link that needs to be deleted: a relay link ID or an RBid that is of the remote terminal device and corresponding to the relay link. Meanwhile, the base station sends a fourth reconfiguration message "relay configuration" (RB configuration) to the relay terminal device to require the relay terminal device to delete an RB serving the remote terminal device or a configuration parameter. Content included in the "relay configuration" message includes at least one of the following: (1) When a relay RB or a link of the relay terminal device carries only data of the remote terminal device, an ID of the RB or a link ID (the identifier of the relay link) is carried, to require the relay terminal device to delete the ID of the RB or the link ID. (2) When a relay RB (service) of the relay terminal device carries not only data of the remote terminal device, the carried parameter is the ID of the remote terminal device, so as to require the relay terminal device to delete a parameter at a protocol layer and/or a buffered data packet that are/is corresponding to the remote terminal device.

After the base station that does not store context information of the remote terminal device receives the second RRC reestablishment request sent by the remote terminal device, the base station reads the source cell ID and the relay terminal device ID that are carried in the second RRC reestablishment request, searches, based on the source cell ID, for a cell that exists before the cellular link of the remote terminal device fails, and sends a "terminal device context acquire" message to the source serving cell. The message includes the source cell ID, the relay terminal device ID, and the terminal device ID of the remote terminal device in the source serving cell, and indicates that a cause is "remote terminal device RRC link reestablishment". After receiving the message, the source serving cell sends a "relay configuration" (RB configuration) to the terminal device corresponding to the relay terminal device ID carried in the message, to require the relay terminal device to delete an RB serving the remote terminal device or a configuration parameter. For content carried in the relay configuration message, refer to the description in the previous paragraph.

Optionally, the base station may also acquire, based on an indication message reported by the relay terminal device, that the first cellular direct link between the base station and the remote terminal device fails. Specifically, when the remote terminal device detects that a downlink between the remote terminal device and the base station fails, the remote terminal device sends, to the relay terminal device over a D2D link, an indication message used to indicate that the first cellular direct link fails. After receiving the indication message, the relay terminal device sends a sixth indication message to the base station over a second cellular direct link, where the sixth indication message is used to indicate that the first cellular direct link fails. After receiving the sixth indication message, the base station may acquire that the first cellular direct link fails.

S503. The remote terminal device deletes link configuration information and/or a buffered data packet that are/is corresponding to the relay link based on the third reconfiguration message sent by the base station.

The remote terminal device deletes a configuration parameter and the buffered data packet that are corresponding to the relay link based on the third reconfiguration message sent by the base station, to reduce system power consumption.

Optionally, when the first cellular direct link of the remote terminal device fails, but the relay link can work normally, the remote terminal device also stops transmission on the D2D link. The process is as follows: For the D2D link, if an RRC layer of the remote terminal device finds that the cellular link fails, the RRC layer notifies an upper layer that the link cannot work, and a data packet on the link that has reached a PDCP layer is discarded; and in addition, the RRC layer instructs a D2D RLC layer and MAC layer to perform resetting. Therefore, D2D transmission stops. For a BT (BLUETOOTH) link, if an RRC layer of the remote terminal device finds that the cellular link fails, the RRC layer notifies an upper layer that the link cannot work, and a data packet on the link that has reached a PDCP layer is discarded; and in addition, the RRC layer notifies a BT module to perform BT link disconnection, and the BT module notifies a peer end based on a BT link disconnection process.

S504. The relay terminal device deletes link related information corresponding to the remote terminal device based on the fourth reconfiguration message sent by the base station.

Specifically, when a relay RB of the relay terminal device is configured specifically for the remote terminal device for use, or when the fourth reconfiguration message carries only an RB ID, the relay terminal device deletes the relay RB and deletes link configuration information and a buffered data packet that are corresponding to the remote terminal device. The deleting link configuration information and a buffered data packet that are corresponding to the remote terminal device is specifically as follows: The relay terminal device deletes a data packet in an entity of a protocol stack corresponding to the remote terminal device, changes a variable in each protocol entity to an initial value, and resets a timer, so as to initialize a part that is in each protocol entity in the relay terminal device and that is corresponding to the remote terminal device. When a relay RB of the relay terminal device is allocated to a plurality of remote terminal devices and shared by the plurality of remote terminal devices, or when the fourth reconfiguration message carries only the identifier of the remote terminal device, the relay terminal device deletes only link configuration information and/or a buffered data packet that are/is at each entity layer of the relay terminal device and that are/is corresponding to the remote terminal device, and does not delete the relay RB, so as to ensure that the relay RB can continue to provide a relay communication capability for another remote terminal device. When the fourth reconfiguration message carries no content, the relay terminal device deletes link configuration information and buffered data packets corresponding to all remote terminal devices that have established D2D connections to the relay terminal device.

By performing the foregoing steps, after the first cellular direct link between the remote terminal device and the base station fails, the base station instructs the relay terminal device to delete the link configuration information and/or the buffered data packet that are/is corresponding to the remote terminal device, so as to release corresponding resources and reduce resource occupation, and the base station instructs the remote terminal device to delete the link related information and the buffered data packet, so as to release corresponding resources and reduce resource occupation.

Figure 6:
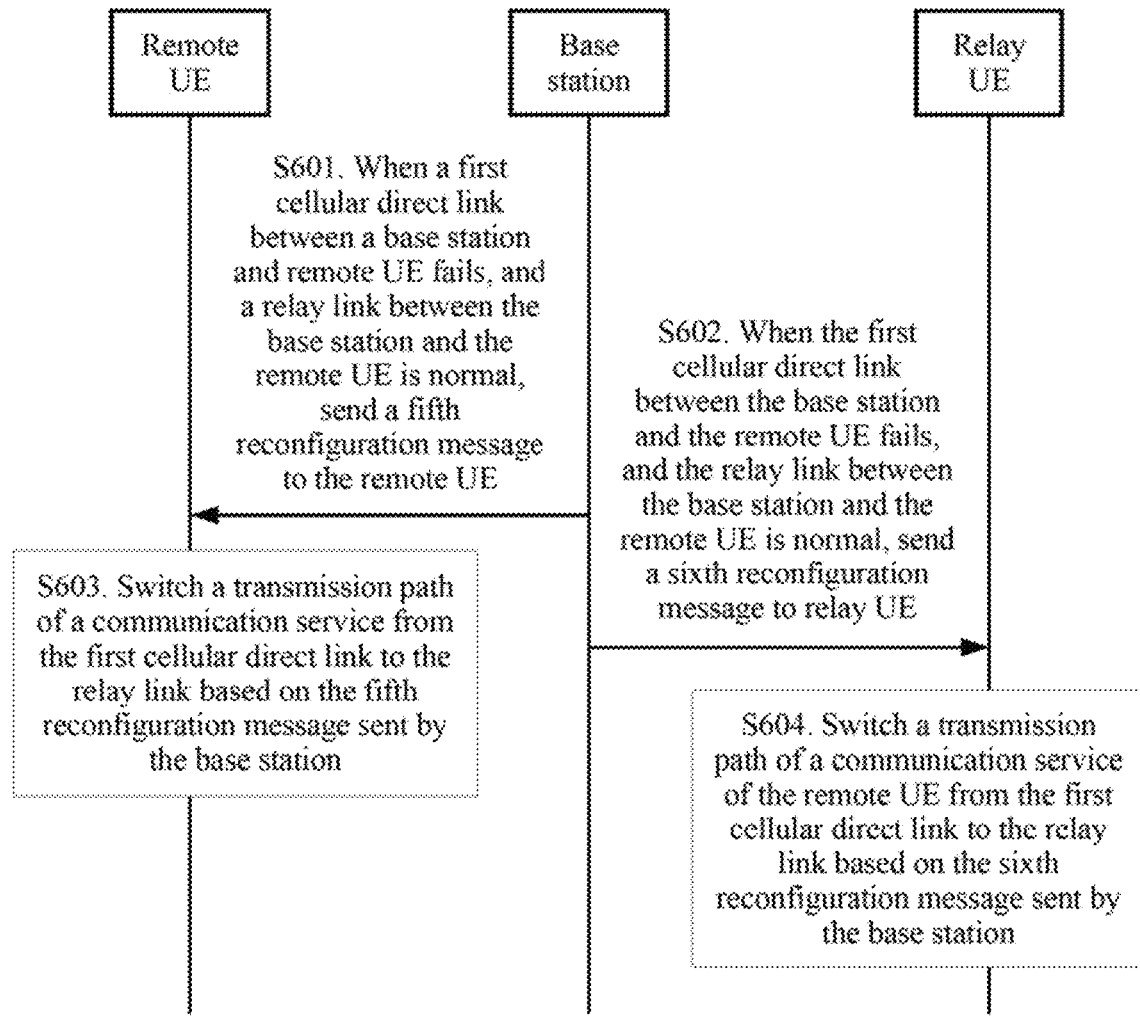
FIG. 6 is a schematic flowchart of another radio link failure handling method according to an embodiment of the present invention.

FIG. 6 is a schematic flowchart of another radio link failure handling method according to an embodiment of the present invention. A scenario in this embodiment is as follows: A relay link between remote terminal device and a base station is normal, but a first cellular direct link between the remote terminal device and the base station fails. A principle of this solution is as follows: Because a D2D link between the remote terminal device and relay terminal device can work normally, and communication between the relay terminal device and the base station can be normally maintained, data of the remote terminal device is all transmitted over the relay link. This requires the base station to hand over all signaling radio bearer (English: Signaling Radio Bearer, SRB) channels of the remote terminal device to the relay link. The method includes but is not limited to steps S601 to S604. Detailed descriptions of the steps are as follows:

S601. When a base station acquires that a first cellular direct link between the base station and remote terminal device fails and a relay link between the base station and the remote terminal device is normal, the base station sends a fifth reconfiguration message to the remote terminal device.

S602. When the base station acquires that the first cellular direct link between the base station and the remote terminal device fails and the relay link between the base station and the remote terminal device is normal, the base station sends a sixth reconfiguration message to relay terminal device.

It should be noted that when the base station acquires that the first cellular direct link between the base station and the remote terminal device fails and the relay link between the base station and the remote terminal device is normal, the base station may only send the fifth reconfiguration message to the remote terminal device and does not need to send the sixth reconfiguration message to the relay terminal device; or when the base station acquires that the first cellular direct link between the base station and the remote terminal device fails and the relay link between the base station and the remote terminal device is normal, the base station may only send the sixth reconfiguration message to the relay terminal device and does not need to send the fifth reconfiguration message to the remote terminal device. In this embodiment of the present invention, an example in which when the base station acquires that the first cellular direct link between the base station and the remote terminal device fails and the relay link between the base station and the remote terminal device is normal, the base station needs to send the fifth reconfiguration message to the remote terminal device and send the sixth reconfiguration message to the relay terminal device is used for description.

The fifth reconfiguration message is used to instruct the remote terminal device to switch a transmission path of a communication service from the first cellular direct link to the relay link. The sixth reconfiguration message is used to instruct the relay terminal device to switch a transmission path of a communication service of the remote terminal device from the first cellular direct link to the relay link.

The remote terminal device sends a second RRC reestablishment request message to the base station when the remote terminal device detects that the first cellular direct link between the remote terminal device and the base station fails. A reestablishment cause value may be set to "UU link failure" in the second RRC reestablishment request message, and the second RRC reestablishment request message may further carry an ID of the UU link. The remote terminal device may send the second RRC reestablishment request message to the base station over the relay link of the relay terminal device. The base station receives the "RRC connection reestablishment request" message, interprets the message, and finds that a Uu downlink of the remote terminal device fails (the base station can only determine that an uplink fails but cannot determine that the downlink fails). Because the message is obtained from the relay link of the remote terminal device, the base station considers that the remote terminal device can communicate with the base station by using the relay link, and determines to hand over an SRB to the relay link.

The base station generates the sixth reconfiguration message "relay reconfiguration", and sends the sixth reconfiguration message to the relay terminal device, so as to enable the relay terminal device to hand over both an SRB 1 and an SRB 2 of the remote terminal device to the relay link. The "relay reconfiguration" carries an SRB configuration parameter of the remote terminal device, for example, an RBid value, an RLC layer parameter, and a MAC layer parameter. The relay terminal device configures a link parameter of each protocol layer of the relay terminal device based on content of the received message.

Optionally, after receiving a configuration complete message from the relay terminal device, the base station sends an "RRC connection reestablishment rejection" message to the remote terminal device. The message may carry a cause value "SRB switch confirm". The message is used by the base station to notify the remote terminal device that the remote terminal device can communicate with the base station by using only the relay link.

S603. The remote terminal device switches a transmission path of a communication service from the first cellular direct link to the relay link based on the fifth reconfiguration message sent by the base station.

The remote terminal device deletes link configuration information corresponding to the first cellular link, and hands over data on the SRB to the relay link, so that the service communication is performed by using the relay link.

S604. The relay terminal device switches a transmission path of a communication service of the remote terminal device from the first cellular direct link to the relay link based on the sixth reconfiguration message sent by the base station.

The relay terminal device configures a related protocol layer parameter based on the SRB configuration parameter of the remote terminal device that is carried in the sixth reconfiguration message sent by the base station, such as the RBid value, the RLC layer parameter, and the MAC layer parameter, so as to hand over the data of the remote terminal device to the relay link for transmission. Optionally, after the relay terminal device completes corresponding configuration, the relay terminal device sends a configuration complete message to the base station.

By performing the foregoing steps, after the first cellular direct link between the remote terminal device and the base station fails, the base station instructs the relay terminal device to hand over the communication service of the remote terminal device to the relay link, and the base station instructs the remote terminal device to switch the transmission path of the communication service from the first cellular direct link to the relay link, thereby ensuring normal operation of the communication service.

To facilitate better implementation of the radio link failure handling method in the embodiments of the present invention, the embodiments of the present invention further provides a related device for implementing the method.

Figure 7:
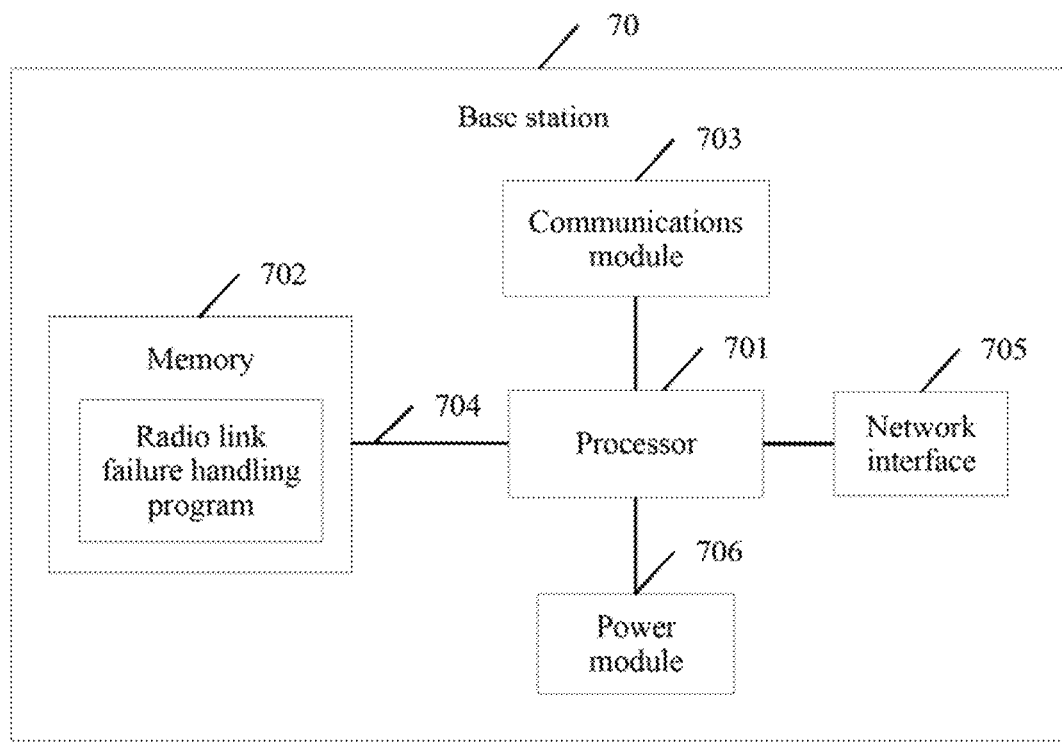
FIG. 7 is a schematic structural diagram of a base station according to an embodiment of the present invention.

FIG. 7 is a schematic structural diagram of a base station according to an embodiment of the present invention. As shown in FIG. 7, the base station 70 includes a processor 701, a memory 702, a communications module 703, and a bus 704. The processor 701, the memory 702, and the communications module 703 may be connected to each other by using the bus or in another manner. For example, in FIG. 7, the connection is implemented by using the bus 704.

Optionally, the base station 70 may further include a network interface 705 and a power module 706.

The processor 701 may be a general purpose processor, for example, a central processing unit (English: Central Processing Unit, CPU).

The memory 702 is configured to store a computer program and a module. Specifically, the computer program includes radio link failure handling program code. The processor 701 runs the radio link failure handling program code and the module in the memory 702 to execute various function applications and process data. The memory 702 may include a volatile memory (English: volatile memory), for example, a random access memory (English: random access memory, RAM). The memory 702 may also include a non-volatile memory (English: non-volatile memory), for example, a read-only memory (English: read-only memory, ROM), a flash memory (English: flash memory), a hard disk drive (English: hard disk drive, HDD), or a solid-state drive (English: solid-state drive, SSD). Alternatively, the memory 702 may include a combination of the foregoing types of memories.

The communications module 703 is configured to perform transmission processing on (for example, modulate) a mobile communication signal generated by the processor 701, and is further configured to perform receiving processing on (for example, demodulate) a mobile communication signal received by an antenna.

The bus 704 may be an industry standard architecture (English: Industry Standard Architecture, ISA) bus, a peripheral component interconnect (English: Peripheral Component Interconnect, PCI) bus, an extended industry standard architecture (English: Extended Industry Standard Architecture, EISA) bus, an inter integrated circuit (English: Inter Integrated Circuit, IIC) bus, or the like.

The network interface 705 is used by the base station 70 to perform data communication with (a mobile station MS in 2G, or terminal device in 3G and 4G). In a specific implementation, the network interface 705 may include one or more of a GSM (2G) wireless network interface, a WCDMA (3G) wireless network interface, an LTE (4G) wireless network interface, and the like; or may be a future 4.5G or 5G wireless network interface.

The power module 706 is configured to supply power to the modules of the base station 70.

In this embodiment of the present invention, the processor 701 is further configured to invoke the radio link failure handling program code in the memory 702, to perform the following operations:

when the processor 701 acquires that a relay link between the base station and remote terminal device fails and a first cellular direct link between the base station and the remote terminal device is normal, the processor 701 sends a first reconfiguration message to the remote terminal device by using the communications module 703, and sends a second reconfiguration message to relay terminal device by using the communications module 703, where the relay link includes a terminal-to-terminal direct link between the remote terminal device and the relay terminal device and a second cellular direct link between the relay terminal device and the base station, the failure of the relay link includes at least one of a failure of the terminal-to-terminal direct link and a failure of the second cellular direct link, the first reconfiguration message is used to instruct the remote terminal device to switch a transmission path of a communication service from the relay link to the first cellular direct link, and the second reconfiguration message is used to instruct the relay terminal device to delete link related information corresponding to the remote terminal device.

By performing the foregoing operations, after the relay link between the remote terminal device and the base station fails, the base station instructs the relay terminal device to delete link configuration information and/or a buffered data packet that are/is corresponding to the remote terminal device, so as to release corresponding resources and reduce resource occupation, and the base station instructs the remote terminal device to switch a communication link, to instruct the remote terminal device to no longer use the relay link to communicate with the base station but use the cellular direct link to communicate with the base station, thereby ensuring normal operation of the service and avoiding communication interruption.

Optionally, before the processor 701 sends the first reconfiguration message to the remote terminal device by using the communications module 703, the processor 701 is further configured to:

receive, by using the communications module 703, a first indication message sent by the remote terminal device over the first cellular direct link, or receive, by using the communications module 703, a first preset random access preamble message sent by the remote terminal device, or receive, by using the communications module 703, a second indication message sent by the relay terminal device over the second cellular direct link, where the first indication message, the first preset random access preamble message, or the second indication message is used to indicate that the terminal-to-terminal direct link fails; and acquire, by the processor based on the received first indication message, first preset random access preamble message, or second indication message, that the relay link fails.

By performing the foregoing operations, the base station may acquire, based on the message reported by the remote terminal device or the relay terminal device, of the event that the terminal-to-terminal direct link between the remote terminal device and the relay terminal device fails, so as to perform corresponding processing on the failed link in a timely manner, thereby ensuring normal communication of the remote terminal device.

Optionally, before the processor 701 sends the first reconfiguration message to the remote terminal device by using the communications module 703, the processor 701 is further configured to:

receive, by using the communications module 703, a third indication message sent by the remote terminal device over the first cellular direct link, or receive, by using the communications module 703, a second preset random access preamble message sent by the remote terminal device, or receive, by using the communications module 703, a first RRC reestablishment request message sent by the relay terminal device, where the third indication message, the second preset random access preamble message, or the first RRC reestablishment request message is used to indicate that the second cellular direct link fails; and acquire, by the processor 701 based on the third indication message, the second preset random access preamble message, or the first RRC reestablishment request message, that the relay link fails.

By performing the foregoing operations, the base station may acquire, based on the message reported by the remote terminal device or the relay terminal device, of the event that the second cellular direct link between the relay terminal device and the base station fails, so as to perform corresponding processing on the failed link in a timely manner, thereby ensuring normal communication of the remote terminal device.

It should be noted that, functions of the function modules of the base station 70 described in this embodiment of the present invention may be implemented based on the related descriptions of the corresponding base station in the embodiment shown in FIG. 4. Details are not described herein again.

Figure 8:
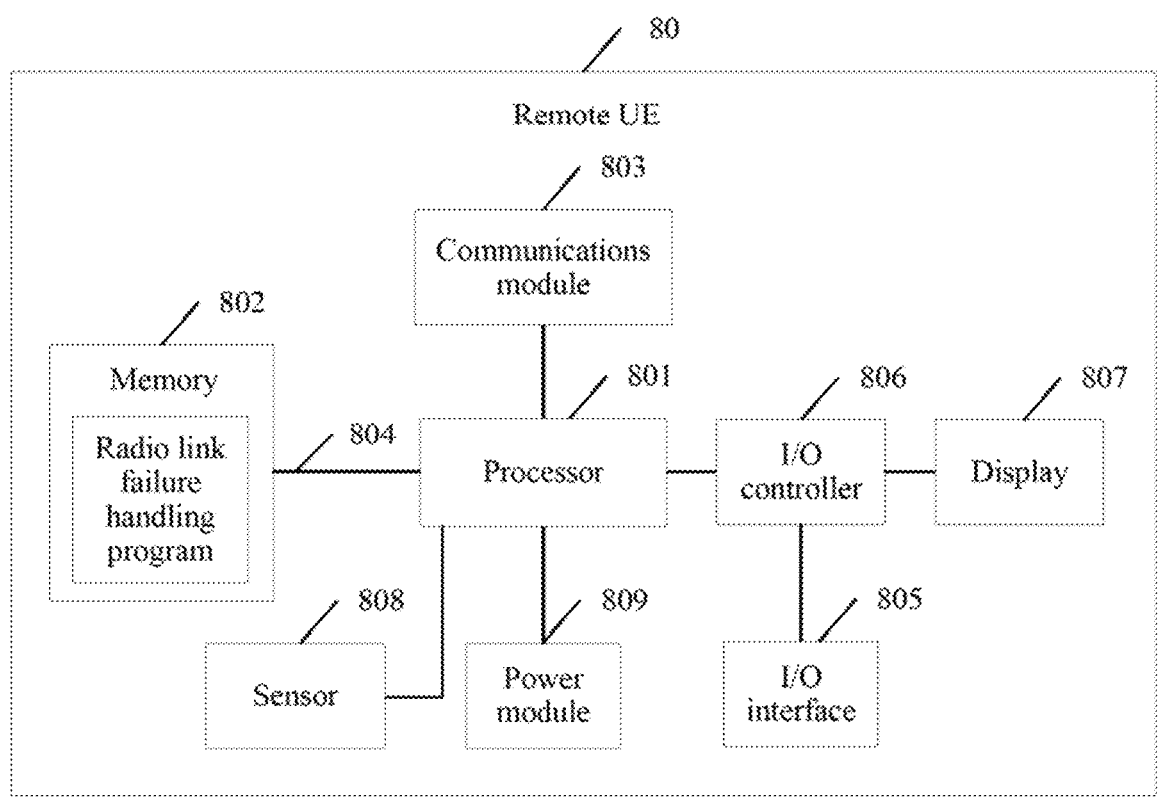
FIG. 8 is a schematic structural diagram of remote terminal device according to an embodiment of the present invention.

FIG. 8 is a schematic structural diagram of remote terminal device according to an embodiment of the present invention. As shown in FIG. 8, the remote terminal device 80 includes a processor 801, a memory 802, a communications module 803, and a bus 804. The processor 801, the memory 802, and the communications module 803 may be connected to each other by using the bus or in another manner. For example, in FIG. 8, the connection is implemented by using the bus 804.

Optionally, the remote terminal device 80 may further include an input/output (English: Input/Output, I/O) interface 805, an I/O controller 806, a display 807, a sensor 808, and a power module 809.

The processor 801 may be a general purpose processor, for example, a CPU, and is configured to run operating system software, required application software, and the like of the remote terminal device 80. The processor 801 may process data received by using the communications module 803. The processor 801 may further process data to be sent to the communications module 803 for wireless transmission.

The memory 802 is configured to: store radio link failure handling program code, and complete storage of various software programs of the terminal device, data storage, software running, and the like. The memory 802 may include a volatile memory, for example, a RAM. Alternatively, the memory 802 may include a non-volatile memory, for example, a ROM, an HDD, or an SSD. Alternatively, the memory 802 may include a combination of the foregoing types of memories.

The communications module 803 provides a communication function for the remote terminal device 80, is configured to perform transmission processing on (for example, amplify, modulate, or encode) a mobile communication signal generated by the processor 801, and is further configured to perform receiving processing on (for example, demodulate or decode) a mobile communication signal received by an antenna. The communications module 803 is applicable to a cellular network, for example, a GSM, UMTS, LTE, or CDMA network, and is also applicable to one or more of a WLAN, a near field communication (English: Near Field Communication, NFC) network, a D2D network, a BLUETOOTH network, a ZIGBEE network, and the like.

The bus 804 may be an ISA bus, a PCI bus, an EISA bus, an IIC bus, or the like.

The I/O interface 805 is an external interface of the remote terminal device 80, and includes one or more of a universal serial bus (English: Universal Serial Bus, USB) interface, a secure digital (English: Secure Digital, SD) card interface, a push-button interface, and the like.

The I/O controller 806 is configured to control data exchange between various input/output devices of the remote terminal device 80, especially, data exchange between the processor 801, the I/O interface 805, and the display 807.

The display 807 is a display screen and a touchscreen of the remote terminal device 80. The display 807 is configured to display a software running status, a power status, time, a user configuration interface, and a configuration result of the remote terminal device 80. The touchscreen is configured to: receive a user touch operation and convert the user touch operation into a user operation instruction.

The sensor 808 includes various sensor devices, including one or more of a global positioning system (English: Global Positioning System, GPS) module, a gravity sensor, an acceleration sensor, a distance sensor, a camera, an optical sensor, and the like.

The power module 809 supplies power to the modules of the remote terminal device 80.

In this embodiment of the present invention, the processor 801 is mainly configured to invoke the program stored in the memory 802, to perform the following operations:

when a relay link between the base station and the remote terminal device fails and a first cellular direct link between the base station and the remote terminal device is normal, the processor 801 switches a transmission path of a communication service from the relay link to the first cellular direct link based on a first reconfiguration message sent by the base station, where the relay link includes a terminal-to-terminal direct link between the remote terminal device and relay terminal device and a second cellular direct link between the relay terminal device and the base station, and the failure of the relay link includes at least one of a failure of the terminal-to-terminal direct link and a failure of the second cellular direct link.

By performing the foregoing operations, when the relay link between the remote terminal device and the base station fails, the remote terminal device switches a communication link, and the remote terminal device does not use the relay link to communicate with the base station but uses the cellular direct link to communicate with the base station, thereby ensuring normal operation of the service and avoiding communication interruption.

Optionally, before the processor 801 switches the transmission path of the communication service from the relay link to the first cellular direct link based on the first reconfiguration message sent by the base station, the processor 801 is further configured to:

when the processor 801 acquires that the terminal-to-terminal direct link fails, send, by the processor 801, a first indication message to the base station over the first cellular direct link, or send a first preset random access preamble message to the base station, where the first indication message or the first preset random access preamble message is used to indicate that the terminal-to-terminal direct link fails; and receive, by the processor 801 by using the communications module 803, the first reconfiguration message sent by the base station.

By performing the foregoing operations, the remote terminal device may report, to the base station, the event that the terminal-to-terminal direct link between the remote terminal device and the relay terminal device fails, so that the base station can perform corresponding processing on the failed link in a timely manner, thereby ensuring normal communication of the remote terminal device.

Optionally, before the processor 801 switches the transmission path of the communication service from the relay link to the first cellular direct link based on the first reconfiguration message sent by the base station, the processor 801 is further configured to:

when the processor 801 acquires that the second cellular direct link fails, send, by the processor 801, a third indication message to the base station over the first cellular direct link, or send a second preset random access preamble message to the base station, where the third indication message or the second preset random access preamble message is used to indicate that the second cellular direct link fails; and receive, by the processor 801 by using the communications module 803, the first reconfiguration message sent by the base station.

By performing the foregoing operations, the remote terminal device may report, to the base station, the event that the second cellular direct link between the relay terminal device and the base station fails, so that the base station can perform corresponding processing on the failed link in a timely manner, thereby ensuring normal communication of the remote terminal device.

Optionally, before the processor 801 sends the third indication message to the base station over the first cellular direct link, the processor 801 is further configured to:

receive, by using the communications module 803, a fourth indication message sent by the relay terminal device, where the fourth indication message is used to indicate that the second cellular direct link fails; and acquire, by the processor 801 based on the fourth indication message, that the second cellular direct link fails.

By performing the foregoing operations, the relay terminal device may notify the remote terminal device of the event that the second cellular direct link fails, and the remote terminal device reports, to the base station, the event that the second cellular direct link between the relay terminal device and the base station fails, so that the base station can perform corresponding processing on the failed link in a timely manner, thereby ensuring normal communication of the remote terminal device.

Optionally, that the processor 801 switches a transmission path of a communication service from the relay link to the first cellular direct link based on a first reconfiguration message sent by the base station includes:

when a cellular radio bearer RB of the remote terminal device is carried on only the relay link, the processor 801 reestablishes a protocol layer of the cellular RB based on parameter information of each protocol layer of the cellular RB that is carried in the first reconfiguration message, and switches a transmission path of the cellular RB from the relay link to the first cellular direct link; or when a cellular radio bearer RB of the remote terminal device is not carried on only the relay link, the processor 801 deletes link configuration information and/or a buffered data packet that are/is corresponding to the relay link based on an identifier of the relay link that is carried in the first reconfiguration message, and hands over the cellular RB from the relay link to the first cellular direct link.

It should be noted that, functions of the function modules of the remote terminal device 80 described in this embodiment of the present invention may be implemented based on the related descriptions of the corresponding remote terminal device in the embodiment shown in FIG. 4. Details are not described herein again.

Figure 9:
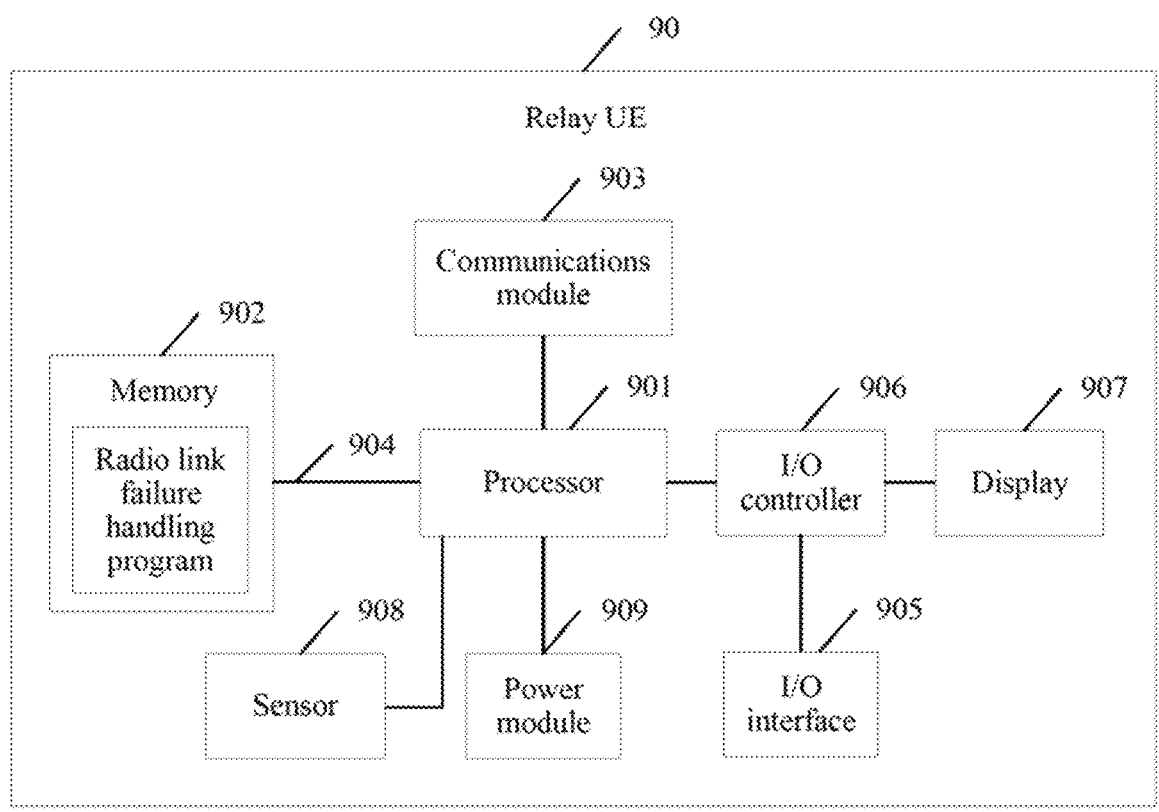
FIG. 9 is a schematic structural diagram of relay terminal device according to an embodiment of the present invention.

FIG. 9 is a schematic structural diagram of relay terminal device according to an embodiment of the present invention. As shown in FIG. 9, the relay terminal device 90 includes a processor 901, a memory 902, a communications module 903, and a bus 904. The processor 901, the memory 902, and the communications module 903 may be connected to each other by using the bus or in another manner. For example, in FIG. 9, the connection is implemented by using the bus 904.

Optionally, the relay terminal device 90 may further include an I/O interface 905, an I/O controller 906, a display 907, a sensor 908, and a power module 909.

The processor 901 may be a general purpose processor, for example, a CPU, and is configured to run operating system software, required application software, and the like of the relay terminal device 90. The processor 901 may process data received by using the communications module 903. The processor 901 may further process data to be sent to the communications module 903 for wireless transmission.

The memory 902 is configured to: store radio link failure handling program code, and complete storage of various software programs of the terminal device, data storage, software running, and the like. The memory 902 may include a volatile memory, for example, a RAM. Alternatively, the memory 902 may include a non-volatile memory, for example, a ROM, an HDD, or an SSD. Alternatively, the memory 902 may include a combination of the foregoing types of memories.

The communications module 903 provides a communication function for the relay terminal device 90, is configured to perform transmission processing on (for example, amplify, modulate, or encode) a mobile communication signal generated by the processor 901, and is further configured to perform receiving processing on (for example, demodulate or decode) a mobile communication signal received by an antenna. The communications module 903 is applicable to a cellular network, for example, a GSM, UMTS, LTE, or CDMA network, and is also applicable to one or more of a WLAN, an NFC network, a D2D network, a BLUETOOTH network, a ZIGBEE network, and the like.

The bus 904 may be an ISA bus, a PCI bus, an EISA bus, an IIC bus, or the like.

The I/O interface 905 is an external interface of the relay terminal device 90, and includes one or more of a USB interface, an SD card interface, a push-button interface, and the like.

The I/O controller 906 is configured to control data exchange between various input/output devices of the relay terminal device 90, especially, data exchange between the processor 901, the I/O interface 905, and the display 907.

The display 907 is a display screen and a touchscreen of the relay terminal device 90. The display 907 is configured to display a software running status, a power status, time, a user configuration interface, and a configuration result of the relay terminal device 90. The touchscreen is configured to: receive a user touch operation and convert the user touch operation into a user operation instruction.

The sensor 908 includes various sensor devices, including one or more of a GPS module, a gravity sensor, an acceleration sensor, a distance sensor, a camera, an optical sensor, and the like.

The power module 909 supplies power to the modules of the relay terminal device 90.

In this embodiment of the present invention, the processor 901 is mainly configured to invoke the program stored in the memory 902, to perform the following operations:

when a relay link between a base station and remote terminal device fails and a first cellular direct link between the base station and the remote terminal device is normal, the processor 901 deletes link related information corresponding to the remote terminal device based on a second reconfiguration message sent by the base station, where the relay link includes a terminal-to-terminal direct link between the remote terminal device and the relay terminal device and a second cellular direct link between the relay terminal device and the base station, and the failure of the relay link includes at least one of a failure of the terminal-to-terminal direct link and a failure of the second cellular direct link.

By performing the foregoing operations, after the relay link between the remote terminal device and the base station fails, the relay terminal device deletes link configuration information and/or a buffered data packet that are/is corresponding to the remote terminal device, so as to release corresponding resources and reduce resource occupation.

Optionally, before the processor 901 deletes the link related information corresponding to the remote terminal device based on the second reconfiguration message sent by the base station, the processor 901 is further configured to:

when the processor 901 acquires that the terminal-to-terminal direct link fails, send, by the processor 901, a second indication message to the base station over the second cellular direct link, where the second indication message is used to indicate that the terminal-to-terminal direct link fails; and receive, by the processor 901 by using the communications module 903, the second reconfiguration message sent by the base station.

By performing the foregoing operations, the relay terminal device may report, to the base station, the event that the terminal-to-terminal direct link between the remote terminal device and the relay terminal device fails, so that the base station can perform corresponding processing on the failed link in a timely manner, thereby ensuring normal communication of the remote terminal device.

Optionally, before the processor 901 deletes the link related information corresponding to the remote terminal device based on the second reconfiguration message sent by the base station, the processor 901 is further configured to:

send, by the processor 901 by using the communications module 903, a first RRC reestablishment request message to the base station when the processor 901 acquires that the second cellular direct link fails, where the first RRC reestablishment request message is used to indicate that the second cellular direct link fails;

receive, by the processor 901 by using the communications module 903, an RRC reestablishment rejection message sent by the base station, where the RRC reestablishment rejection message includes the second reconfiguration message; and obtain, by the processor 901, the second reconfiguration message from the RRC reestablishment rejection message.

By performing the foregoing operations, the relay terminal device may report, to the base station, the event that the second cellular direct link between the relay terminal device and the base station fails, so that the base station can perform corresponding processing on the failed link in a timely manner, thereby ensuring normal communication of the remote terminal device.

Optionally, that the processor 901 deletes link related information corresponding to the remote terminal device based on a second reconfiguration message sent by the base station includes:

when a relay RB on the second cellular direct link is allocated to only the remote terminal device, the processor 901 deletes the relay RB, and configuration information and/or a buffered data packet that are/is corresponding to the relay RB based on an identifier of the relay link that is carried in the second reconfiguration message sent by the base station; or when a relay radio bearer RB on the second cellular direct link is not allocated to only the remote terminal device, the processor 901 deletes configuration information and/or a buffered data packet that are/is in the relay RB and corresponding to the remote terminal device based on an identifier of the remote terminal device that is carried in the second reconfiguration message sent by the base station.

It should be noted that, functions of the function modules of the relay terminal device 90 described in this embodiment of the present invention may be implemented based on the related descriptions of the corresponding relay terminal device in the embodiment shown in FIG. 4. Details are not described herein again.

Figure 10:
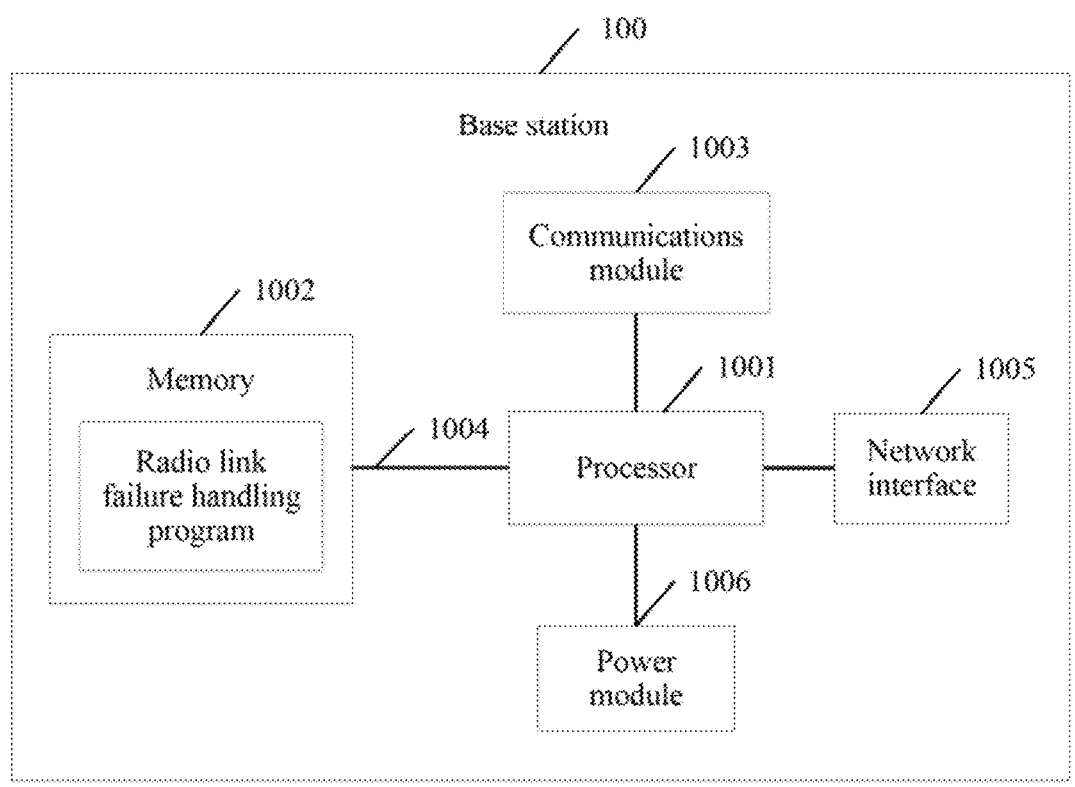
FIG. 10 is a schematic structural diagram of another base station according to an embodiment of the present invention.

FIG. 10 is a schematic structural diagram of a base station according to an embodiment of the present invention. As shown in FIG. 10, the base station 100 includes a processor 1001, a memory 1002, a communications module 1003, and a bus 1004. The processor 1001, the memory 1002, and the communications module 1003 may be connected to each other by using the bus or in another manner. For example, in FIG. 10, the connection is implemented by using the bus 1004.

Optionally, the base station 100 may further include a network interface 1005 and a power module 1006.

The processor 1001 may be a general purpose processor, for example, a CPU.

The memory 1002 is configured to store a computer program and a module. Specifically, the computer program includes radio link failure handling program code. The processor 1001 runs the radio link failure handling program code and the module in the memory 1002 to execute various function applications and process data. The memory 1002 may include a volatile memory, for example, a RAM. Alternatively, the memory 1002 may include a non-volatile memory, for example, a ROM, a flash memory, an HDD, or an SSD. Alternatively, the memory 1002 may include a combination of the foregoing types of memories.

The communications module 1003 is configured to perform transmission processing on (for example, modulate) a mobile communication signal generated by the processor 1001, and is further configured to perform receiving processing on (for example, demodulate) a mobile communication signal received by an antenna.

The bus 1004 may be an ISA bus, a PCI bus, an EISA bus, an IIC bus, or the like.

The network interface 1005 is used by the base station 100 to perform data communication with user equipment (a mobile station MS in 2G, or terminal device in 3G and 4G). In a specific implementation, the network interface 1005 may include one or more of a GSM (2G) wireless network interface, a WCDMA (3G) wireless network interface, an LTE (4G) wireless network interface, and the like; or may be a future 4.5G or 5G wireless network interface.

The power module 1006 is configured to supply power to the modules of the base station 100.

In this embodiment of the present invention, the processor 1001 is further configured to invoke the radio link failure handling program code in the memory 1002, to perform the following operations:

when the processor 1001 acquires that a first cellular direct link between the base station and remote terminal device fails and a relay link between the base station and the remote terminal device is normal, the processor 1001 sends a third reconfiguration message to the remote terminal device by using the communications module 1003, or sends a fourth reconfiguration message to relay terminal device by using the communications module 1003; or when the processor 1001 acquires that a first cellular direct link between the base station and remote terminal device fails and a relay link between the base station and the remote terminal device is normal, the processor 1001 sends a fifth reconfiguration message to the remote terminal device by using the communications module 1003, or sends a sixth reconfiguration message to relay terminal device by using the communications module 1003, where the relay link includes a terminal-to-terminal direct link between the remote terminal device and the relay terminal device and a second cellular direct link between the relay terminal device and the base station, the third reconfiguration message is used to instruct the remote terminal device to delete link configuration information and/or a buffered data packet that are/is corresponding to the relay link, the fourth reconfiguration message is used to instruct the relay terminal device to delete link related information corresponding to the remote terminal device, the fifth reconfiguration message is used to instruct the remote terminal device to switch a transmission path of a communication service from the first cellular direct link to the relay link, and the sixth reconfiguration message is used to instruct the relay terminal device to switch a transmission path of a communication service of the remote terminal device from the first cellular direct link to the relay link.

By performing the foregoing operations, after the first cellular direct link between the remote terminal device and the base station fails, the base station instructs the relay terminal device to delete link configuration information and/or a buffered data packet that are/is corresponding to the remote terminal device, so as to release corresponding resources and reduce resource occupation, and the base station instructs the remote terminal device to delete the link configuration information and/or the buffered data packet that are/is corresponding to the relay link, so as to release corresponding resources and reduce resource occupation. Alternatively, after the first cellular direct link between the remote terminal device and the base station fails, the base station instructs the relay terminal device to hand over the communication service of the remote terminal device to the relay link, so as to ensure normal communication of the remote terminal device, and instructs the remote terminal device to no longer use the first cellular direct link to communicate with the base station but use the relay link to communicate with the base station, thereby ensuring normal operation of the service and avoiding communication interruption.

Optionally, before the processor 1001 sends the third reconfiguration message to the remote terminal device by using the communications module 1003, or before sending the fourth reconfiguration message to the relay terminal device, or before the processor 1001 sends the fifth reconfiguration message to the remote terminal device by using the communications module 1003, or before sending the sixth reconfiguration message to the relay terminal device, the processor 1001 is further configured to:

receive, by using the communications module 1003, a fifth indication message sent by the remote terminal device over the relay link, or receive, by using the communications module 1003, a third preset random access preamble message sent by the remote terminal device, or receive, by using the communications module 1003, a second RRC reestablishment request message sent by the remote terminal device, or receive, by using the communications module 1003, a sixth indication message sent by the relay terminal device over the second cellular direct link, where the fifth indication message, the third preset random access preamble message, or the sixth indication message is used to indicate that the first cellular direct link fails; and acquire, by the processor 1001 based on the fifth indication message, the third preset random access preamble message, the second RRC reestablishment request message, or the sixth indication message, that the first cellular direct link fails.

By performing the foregoing operations, the base station may acquire, based on the message reported by the remote terminal device or the relay terminal device, of the event that the first cellular direct link between the remote terminal device and the base station fails, so as to perform corresponding processing on the failed link in a timely manner, thereby ensuring normal communication of the remote terminal device.

Optionally, the third reconfiguration message includes an identifier of the relay link, the fourth reconfiguration message includes an identifier of the relay link that needs to be deleted or includes an identifier of the remote terminal device, the fifth reconfiguration message includes an identifier of the relay link, and the sixth reconfiguration message includes parameter information of each protocol layer of a cellular radio bearer RB of the remote terminal device.

It should be noted that, functions of the function modules of the base station 100 described in this embodiment of the present invention may be implemented based on the related descriptions of the corresponding base station in the embodiment shown in FIG. 5 or FIG. 6. Details are not described herein again.

Figure 11:
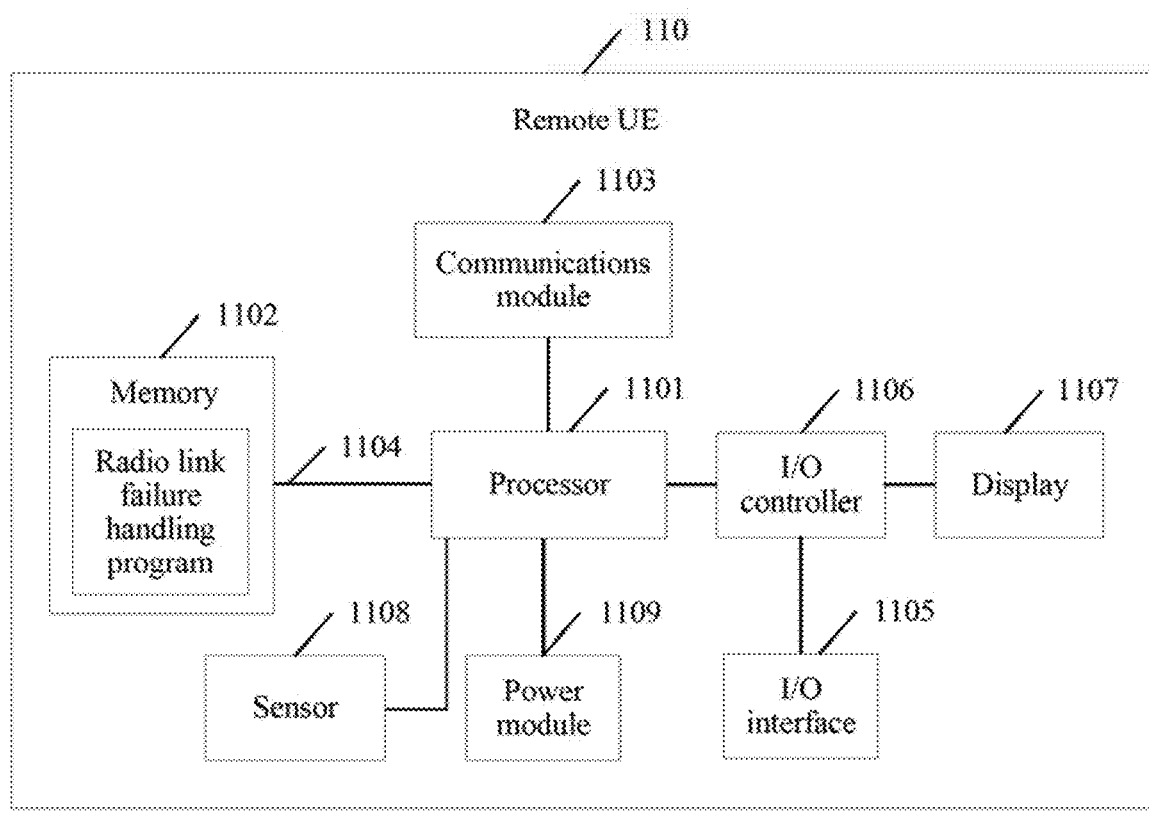
FIG. 11 is a schematic structural diagram of another remote terminal device according to an embodiment of the present invention.

FIG. 11 is a schematic structural diagram of remote terminal device according to an embodiment of the present invention. As shown in FIG. 11, the remote terminal device 110 includes a processor 1101, a memory 1102, a communications module 1103, and a bus 1104. The processor 1101, the memory 1102, and the communications module 1103 may be connected to each other by using the bus or in another manner. For example, in FIG. 11, the connection is implemented by using the bus 1104.

Optionally, the remote terminal device 110 may further include an I/O interface 1105, an I/O controller 1106, a display 1107, a sensor 1108, and a power module 1109.

The processor 1101 may be a general purpose processor, for example, a CPU, and is configured to run operating system software, required application software, and the like of the remote terminal device 110. The processor 1101 may process data received by using the communications module 1103. The processor 1101 may further process data to be sent to the communications module 1103 for wireless transmission.

The memory 1102 is configured to: store radio link failure handling program code, and complete storage of various software programs of the terminal device, data storage, software running, and the like. The memory 1102 may include a volatile memory, for example, a RAM. Alternatively, the memory 1102 may include a non-volatile memory, for example, a ROM, an HDD, or an SSD. Alternatively, the memory 1102 may include a combination of the foregoing types of memories.

The communications module 1103 provides a communication function for the remote terminal device 110, is configured to perform transmission processing on (for example, amplify, modulate, or encode) a mobile communication signal generated by the processor 1101, and is further configured to perform receiving processing on (for example, demodulate or decode) a mobile communication signal received by an antenna. The communications module 1103 is applicable to a cellular network, for example, a GSM, UMTS, LTE, or CDMA network, and is also applicable to one or more of a WLAN, an NFC network, a D2D network, a BLUETOOTH network, a ZIGBEE network, and the like.

The bus 1104 may be an ISA bus, a PCI bus, an EISA bus, an IIC bus, or the like.

The I/O interface 1105 is an external interface of the remote terminal device 110, and includes one or more of a USB interface, an SD card interface, a push-button interface, and the like.

The I/O controller 1106 is configured to control data exchange between various input/output devices of the remote terminal device 110, especially, data exchange between the processor 1101, the I/O interface 1105, and the display 1107.

The display 1107 is a display screen and a touchscreen of the remote terminal device 110. The display 1107 is configured to display a software running status, a power status, time, a user configuration interface, and a configuration result of the remote terminal device 110. The touchscreen is configured to: receive a user touch operation and convert the user touch operation into a user operation instruction.

The sensor 1108 includes various sensor devices, including one or more of a GPS module, a gravity sensor, an acceleration sensor, a distance sensor, a camera, an optical sensor, and the like.

The power module 1109 supplies power to the modules of the remote terminal device 110.

In this embodiment of the present invention, the processor 1101 is mainly configured to invoke the program stored in the memory 1102, to perform the following operations:

when a first cellular direct link between the remote terminal device and a base station fails and a relay link between the base station and the remote terminal device is normal, the processor 1101 deletes link configuration information and/or a buffered data packet that are/is corresponding to the relay link based on a third reconfiguration message sent by the base station; or when a first cellular direct link between the remote terminal device and a base station fails and a relay link between the base station and the remote terminal device is normal, the processor 1101 switches a transmission path of a communication service from the first cellular direct link to the relay link; or when a first cellular direct link between the remote terminal device and a base station fails and a relay link between the base station and the remote terminal device is normal, the processor 1101 switches a transmission path of a communication service from the first cellular direct link to the relay link based on a fifth reconfiguration message sent by the base station, where the relay link includes a terminal-to-terminal direct link between the remote terminal device and the relay terminal device and a second cellular direct link between the relay terminal device and the base station.

By performing the foregoing operations, after the first cellular direct link between the remote terminal device and the base station fails, the remote terminal device deletes the link configuration information and/or the buffered data packet that are/is corresponding to the relay link, so as to release corresponding resources and reduce resource occupation. Alternatively, the remote terminal device switches a communication link, and does not use the first cellular direct link to communicate with the base station but uses the relay link to communicate with the base station, thereby ensuring normal operation of the service and avoiding communication interruption.

Optionally, before the processor 1101 deletes the link configuration information and/or the buffered data packet that are/is corresponding to the relay link based on the third reconfiguration message sent by the base station, the processor 1101 is further configured to:

when the processor 1101 acquires that the first cellular direct link fails, send a fifth indication message to the base station over the relay link, or send, by the processor 1101, a third preset random access preamble message to the base station by using the communications module 1103, or send, by the processor 1101, a second RRC reestablishment request message to the base station by using the communications module 1103, where the fifth indication message, the third preset random access preamble message, or the second RRC reestablishment request message is used to indicate that the first cellular direct link fails; and receive, by the processor 1101 by using the communications module 1103, the third reconfiguration message sent by the base station; or before the processor 1101 switches the transmission path of the communication service from the first cellular direct link to the relay link based on the fifth reconfiguration message sent by the base station, the processor 1101 is further configured to:

when the processor 1101 acquires that the first cellular direct link fails, send a fifth indication message to the base station over the relay link, or send, by the processor 1101, a third preset random access preamble message to the base station by using the communications module 1103, or send, by the processor 1101, a second RRC reestablishment request message to the base station by using the communications module 1103, where the fifth indication message, the third preset random access preamble message, or the second RRC reestablishment request message is used to indicate that the first cellular direct link fails; and receive, by the processor 1101 by using the communications module 1103, the fifth reconfiguration message sent by the base station.

By performing the foregoing operations, the remote terminal device may report, to the base station, the event that the first cellular direct link between the remote terminal device and the base station fails, so that the base station can perform corresponding processing on the failed link in a timely manner, thereby ensuring normal communication of the remote terminal device.

Optionally, that the processor 1101 deletes link configuration information and/or a buffered data packet that are/is corresponding to the relay link based on a third reconfiguration message sent by the base station includes:

the processor 1101 deletes the link configuration information and/or the buffered data packet that are/is corresponding to the relay link based on an identifier of the relay link that is carried in the third reconfiguration message sent by the base station.

It should be noted that, functions of the function modules of the remote terminal device 110 described in this embodiment of the present invention may be implemented based on the related descriptions of the corresponding remote terminal device in the embodiment shown in FIG. 5 or FIG. 6. Details are not described herein again.

Figure 12:
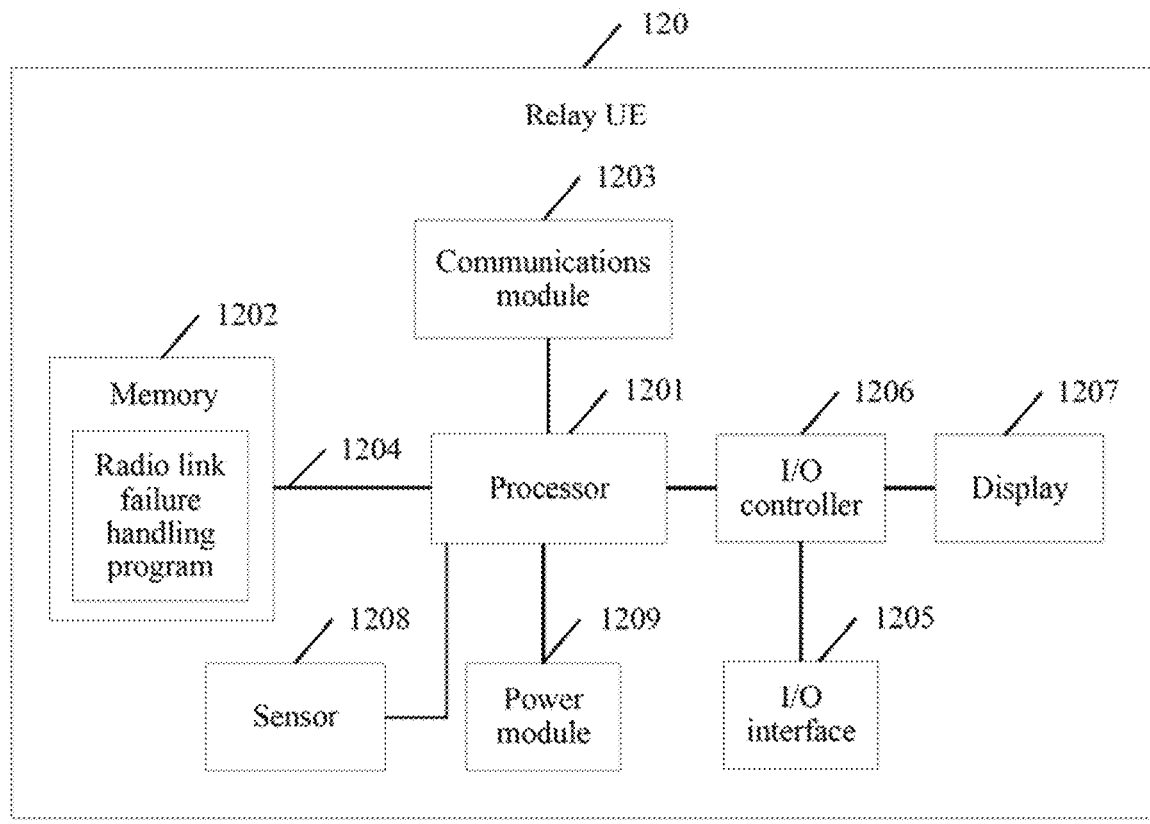
FIG. 12 is a schematic structural diagram of another relay terminal device according to an embodiment of the present invention.

FIG. 12 is a schematic structural diagram of relay terminal device according to an embodiment of the present invention. As shown in FIG. 12, the relay terminal device 120 includes a processor 1201, a memory 1202, a communications module 1203, and a bus 1204. The processor 1201, the memory 1202, and the communications module 1203 may be connected to each other by using the bus or in another manner. For example, in FIG. 12, the connection is implemented by using the bus 1204.

Optionally, the relay terminal device 120 may further include an I/O interface 1205, an I/O controller 1206, a display 1207, a sensor 1208, and a power module 1209.

The processor 1201 may be a general purpose processor, for example, a CPU, and is configured to run operating system software, required application software, and the like of the relay terminal device 120. The processor 1201 may process data received by using the communications module 1203. The processor 1201 may further process data to be sent to the communications module 1203 for wireless transmission.

The memory 1202 is configured to: store radio link failure handling program code, and complete storage of various software programs of the terminal device, data storage, software running, and the like. The memory 1202 may include a volatile memory, for example, a RAM. Alternatively, the memory 1202 may include a non-volatile memory, for example, a ROM, an HDD, or an SSD. Alternatively, the memory 1202 may include a combination of the foregoing types of memories.

The communications module 1203 provides a communication function for the relay terminal device 120, is configured to perform transmission processing on (for example, amplify, modulate, or encode) a mobile communication signal generated by the processor 1201, and is further configured to perform receiving processing on (for example, demodulate or decode) a mobile communication signal received by an antenna. The communications module 1203 is applicable to a cellular network, for example, a GSM, UMTS, LTE, or CDMA network, and is also applicable to one or more of a WLAN, an NFC network, a D2D network, a BLUETOOTH network, a ZIGBEE network, and the like.

The bus 1204 may be an ISA bus, a PCI bus, an EISA bus, an IIC bus, or the like.

The I/O interface 1205 is an external interface of the relay terminal device 120, and includes one or more of a USB interface, an SD card interface, a push-button interface, and the like.

The I/O controller 1206 is configured to control data exchange between various input/output devices of the relay terminal device 120, especially, data exchange between the processor 1201, the I/O interface 1205, and the display 1207.

The display 1207 is a display screen and a touchscreen of the relay terminal device 120. The display 1207 is configured to display a software running status, a power status, time, a user configuration interface, and a configuration result of the relay terminal device 120. The touchscreen is configured to: receive a user touch operation and convert the user touch operation into a user operation instruction.

The sensor 1208 includes various sensor devices, including one or more of a GPS module, a gravity sensor, an acceleration sensor, a distance sensor, a camera, an optical sensor, and the like.

The power module 1209 supplies power to the modules of the relay terminal device 120.

In this embodiment of the present invention, the processor 1201 is mainly configured to invoke the program stored in the memory 1202, to perform the following operations:

when a first cellular direct link between remote terminal device and a base station fails and a relay link between the base station and the remote terminal device is normal, the processor 1201 deletes link related information corresponding to the remote terminal device based on a fourth reconfiguration message sent by the base station; or when a first cellular direct link between remote terminal device and a base station fails and a relay link between the base station and the remote terminal device is normal, the processor 1201 switches a transmission path of a communication service of the remote terminal device from the first cellular direct link to the relay link based on a sixth reconfiguration message sent by the base station, where the relay link includes a terminal-to-terminal direct link between the remote terminal device and the relay terminal device and a second cellular direct link between the relay terminal device and the base station.

By performing the foregoing operations, after the first cellular direct link between the remote terminal device and the base station fails, the relay terminal device deletes link configuration information and/or a buffered data packet that are/is corresponding to the remote terminal device, so as to release corresponding resources and reduce resource occupation. Alternatively, after the first cellular direct link between the remote terminal device and the base station fails, the relay terminal device hands over the communication service of the remote terminal device to the relay link, so as to ensure normal communication of the remote terminal device.

Optionally, before the processor 1201 deletes the link related information corresponding to the remote terminal device based on the fourth reconfiguration message sent by the base station, the processor 1201 is further configured to:

when the processor 1201 acquires that the first cellular direct link between the base station and the remote terminal device fails, send, by the processor 1201, a sixth indication message to the base station over the second cellular direct link, where the sixth indication message is used to indicate that the first cellular direct link fails; and receive, by the processor 1201 by using the communications module 1203, the fourth reconfiguration message sent by the base station; or before the processor 1201 switches the transmission path of the communication service of the remote terminal device from the first cellular direct link to the relay link based on the sixth reconfiguration message sent by the base station, the processor 1201 is further configured to:

when the processor 1201 acquires that the first cellular direct link between the base station and the remote terminal device fails, send, by the processor 1201, a sixth indication message to the base station over the second cellular direct link, where the sixth indication message is used to indicate that the first cellular direct link fails; and receive, by the processor 1201 by using the communications module 1203, the sixth reconfiguration message sent by the base station.

By performing the foregoing operations, the relay terminal device may report, to the base station, the event that the first cellular direct link between the remote terminal device and the base station fails, so that the base station can perform corresponding processing on the failed link in a timely manner, thereby ensuring normal communication of the remote terminal device.

Optionally, that the processor 1201 deletes link related information corresponding to the remote terminal device based on a fourth reconfiguration message sent by the base station includes:

when a relay radio bearer RB on the second cellular direct link is allocated to only the remote terminal device, the processor 1201 deletes the relay RB, and configuration information and/or a buffered data packet that are/is corresponding to the relay RB based on an identifier of the relay link that is carried in the fourth reconfiguration message sent by the base station; or when a relay radio bearer RB on the second cellular direct link is not allocated to only the remote terminal device, the processor 1201 deletes configuration information and/or a buffered data packet that are/is in the relay RB and corresponding to the remote terminal device based on an identifier of the remote terminal device that is carried in the fourth reconfiguration message sent by the base station.

Optionally, that the processor 1201 switches a transmission path of a communication service of the remote terminal device from the first cellular direct link to the relay link based on a sixth reconfiguration message sent by the base station includes:

the processor 1201 reconfigures a protocol layer corresponding to the remote terminal device based on reconfiguration information corresponding to a cellular RB of the remote terminal device that is carried in the sixth reconfiguration message sent by the base station, and switches the transmission path of the communication service of the remote terminal device from the first cellular direct link to the relay link.

It should be noted that, functions of the function modules of the relay terminal device 120 described in this embodiment of the present invention may be implemented based on the related descriptions of the corresponding relay terminal device in the embodiment shown in FIG. 5 or FIG. 6. Details are not described herein again.

Figure 13:
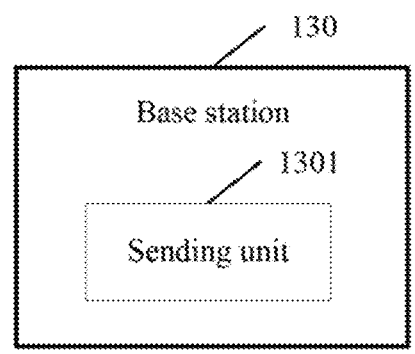
FIG. 13 is a schematic structural diagram of another base station according to an embodiment of the present invention.

FIG. 13 is a schematic structural diagram of another base station according to an embodiment of the present invention. As shown in FIG. 13, the base station 130 includes a sending unit 1301.

The sending unit 1301 is configured to: when it is acquiret that a relay link between the base station and remote terminal device fails and a first cellular direct link between the base station and the remote terminal device is normal, send a first reconfiguration message to the remote terminal device, and send a second reconfiguration message to relay terminal device, where the relay link includes a terminal-to-terminal direct link between the remote terminal device and the relay terminal device and a second cellular direct link between the relay terminal device and the base station, the failure of the relay link includes at least one of a failure of the terminal-to-terminal direct link and a failure of the second cellular direct link, the first reconfiguration message is used to instruct the remote terminal device to switch a transmission path of a communication service from the relay link to the first cellular direct link, and the second reconfiguration message is used to instruct the relay terminal device to delete link related information corresponding to the remote terminal device.

In this embodiment, the base station 130 is presented in a form of a functional unit. The "unit" herein may be an application-specific integrated circuit (English: Application-Specific Integrated Circuit, ASIC), a processor and a memory that execute one or more software or firmware programs, an integrated logic circuit, and/or another component that can provide the foregoing functions. The base station 130 may use a form shown in FIG. 7. The sending unit 1301 may be implemented by using the processor 701 in FIG. 7, or may be implemented by using the communications module 703 in FIG. 7.

Optionally, the base station 130 further includes:

a first receiving unit, configured to: receive a first indication message sent by the remote terminal device over the first cellular direct link, or receive a first preset random access preamble message sent by the remote terminal device, or receive a second indication message sent by the relay terminal device over the second cellular direct link, where the first indication message, the first preset random access preamble message, or the second indication message is used to indicate that the terminal-to-terminal direct link fails; and a first acquiring unit, configured to acquire, based on the received first indication message, first preset random access preamble message, or second indication message, that the relay link fails.

Optionally, the base station 130 further includes:

a second receiving unit, configured to: receive a third indication message sent by the remote terminal device over the first cellular direct link, or receive a second preset random access preamble message sent by the remote terminal device, or receive a first RRC reestablishment request message sent by the relay terminal device, where the third indication message, the second preset random access preamble message, or the first RRC reestablishment request message is used to indicate that the second cellular direct link fails; and a second acquiring unit, configured to acquire, based on the third indication message, the second preset random access preamble message, or the first RRC reestablishment request message, that the relay link fails.

It should be noted that, functions of the functional units of the base station 130 described in this embodiment of the present invention may be implemented based on the related descriptions of the base station in the embodiment shown in FIG. 4. Details are not described herein again.

Figure 14:
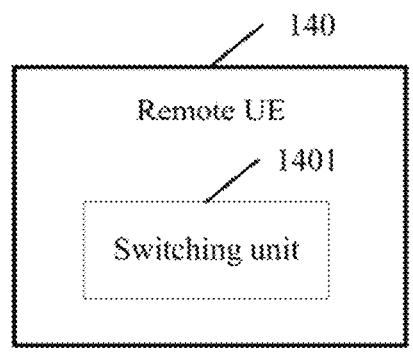
FIG. 14 is a schematic structural diagram of another remote terminal device according to an embodiment of the present invention.

FIG. 14 is a schematic structural diagram of another remote terminal device according to an embodiment of the present invention. As shown in FIG. 14, the remote terminal device 140 includes a switching unit 1401.

The switching unit 1401 is configured to: when a relay link between a base station and the remote terminal device fails and a first cellular direct link between the base station and the remote terminal device is normal, switch a transmission path of a communication service from the relay link to the first cellular direct link based on a first reconfiguration message sent by the base station, where the relay link includes a terminal-to-terminal direct link between the remote terminal device and relay terminal device and a second cellular direct link between the relay terminal device and the base station, and the failure of the relay link includes at least one of a failure of the terminal-to-terminal direct link and a failure of the second cellular direct link.

In this embodiment, the remote terminal device 140 is presented in a form of a functional unit. The "unit" herein may be an ASIC, a processor and a memory that execute one or more software or firmware programs, an integrated logic circuit, and/or another component that can provide the functions. The remote terminal device 140 may use a form shown in FIG. 8. The switching unit 1401 may be implemented by using the processor 801 in FIG. 8.

Optionally, the remote terminal device 140 further includes:

a first sending unit, configured to: when it is acquiret that the terminal-to-terminal direct link fails, send a first indication message to the base station over the first cellular direct link, or send a first preset random access preamble message to the base station, where the first indication message or the first preset random access preamble message is used to indicate that the terminal-to-terminal direct link fails; and a first receiving unit, configured to receive the first reconfiguration message sent by the base station.

Optionally, the remote terminal device 140 further includes:

a second sending unit, configured to: when it is acquiret that the second cellular direct link fails, send a third indication message to the base station over the first cellular direct link, or send a second preset random access preamble message to the base station, where the third indication message or the second preset random access preamble message is used to indicate that the second cellular direct link fails; and a second receiving unit, configured to receive the first reconfiguration message sent by the base station.

Optionally, the remote terminal device 140 further includes:

a third receiving unit, configured to: before the foregoing second sending unit sends the third indication message to the base station over the first cellular direct link, receive a fourth indication message sent by the relay terminal device, where the fourth indication message is used to indicate that the second cellular direct link fails; and a acquiring unit, configured to acquire, based on the fourth indication message, that the second cellular direct link fails.

Optionally, the switching unit 1401 is specifically configured to:

when a cellular radio bearer RB of the remote terminal device is carried on only the relay link, reestablish a protocol layer of the cellular RB based on parameter information of each protocol layer of the cellular RB that is carried in the first reconfiguration message, and hand over the cellular RB from the relay link to the first cellular direct link; or when a cellular radio bearer RB of the remote terminal device is not carried on only the relay link, delete link configuration information and/or a buffered data packet that are/is corresponding to the relay link based on an identifier of the relay link that is carried in the first reconfiguration message, and hand over the cellular RB from the relay link to the first cellular direct link.

It should be noted that, functions of the functional units of the remote terminal device 140 described in this embodiment of the present invention may be implemented based on the related descriptions of the remote terminal device in the embodiment shown in FIG. 4. Details are not described herein again.

Figure 15:
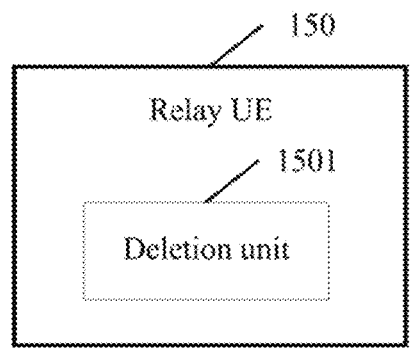
FIG. 15 is a schematic structural diagram of another relay terminal device according to an embodiment of the present invention.

FIG. 15 is a schematic structural diagram of another relay terminal device according to an embodiment of the present invention. As shown in FIG. 15, the relay terminal device 150 includes a deletion unit 1501.

The deletion unit 1501 is configured to: when a relay link between a base station and remote terminal device fails and a first cellular direct link between the base station and the remote terminal device is normal, delete link related information corresponding to the remote terminal device based on a second reconfiguration message sent by the base station, where the relay link includes a terminal-to-terminal direct link between the remote terminal device and the relay terminal device and a second cellular direct link between the relay terminal device and the base station, and the failure of the relay link includes at least one of a failure of the terminal-to-terminal direct link and a failure of the second cellular direct link.

In this embodiment, the relay terminal device 150 is presented in a form of a functional unit. The "unit" herein may be an ASIC, a processor and a memory that execute one or more software or firmware programs, an integrated logic circuit, and/or another component that can provide the functions. The relay terminal device 150 may use a form shown in FIG. 9. The deletion unit 1501 may be implemented by using the processor 901 in FIG. 9.

Optionally, the relay terminal device 150 further includes:

a first sending unit, configured to: when the relay terminal device acquires that the terminal-to-terminal direct link fails, send a second indication message to the base station over the second cellular direct link, where the second indication message is used to indicate that the terminal-to-terminal direct link fails; and a first receiving unit, configured to receive the second reconfiguration message sent by the base station.

Optionally, the relay terminal device 150 further includes:

a second sending unit, configured to send a first RRC reestablishment request message to the base station when the relay terminal device acquires that the second cellular direct link fails, where the first RRC reestablishment request message is used to indicate that the second cellular direct link fails;

a second receiving unit, configured to receive an RRC reestablishment rejection message sent by the base station, where the RRC reestablishment rejection message includes the second reconfiguration message; and an obtaining unit, configured to obtain the second reconfiguration message from the RRC reestablishment rejection message.

Optionally, the deletion unit 1501 is specifically configured to:

when a relay radio bearer RB on the second cellular direct link is allocated to only the remote terminal device, delete the relay RB, and configuration information and/or a buffered data packet that are/is corresponding to the relay RB based on an identifier of the relay link that is carried in the second reconfiguration message sent by the base station; or when a relay radio bearer RB on the second cellular direct link is not allocated to only the remote terminal device, delete configuration information and/or a buffered data packet that are/is in the relay RB and corresponding to the remote terminal device based on an identifier of the remote terminal device that is carried in the second reconfiguration message sent by the base station.

It should be noted that, functions of the functional units of the relay terminal device 150 described in this embodiment of the present invention may be implemented based on the related descriptions of the relay terminal device in the embodiment shown in FIG. 4. Details are not described herein again.

Figure 16:
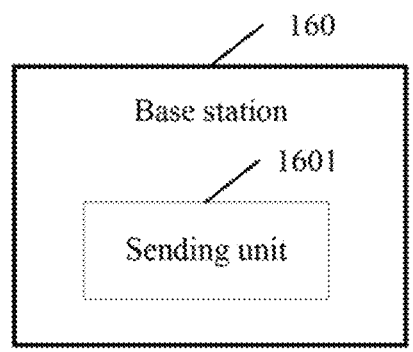
FIG. 16 is a schematic structural diagram of another base station according to an embodiment of the present invention.

FIG. 16 is a schematic structural diagram of another base station according to an embodiment of the present invention. As shown in FIG. 16, the base station 160 includes a sending unit 1601.

The sending unit 1601 is configured to: when it is acquiret that a first cellular direct link between the base station and remote terminal device fails and a relay link between the base station and the remote terminal device is normal, send a third reconfiguration message to the remote terminal device, or send a fourth reconfiguration message to relay terminal device; or when it is acquiret that a first cellular direct link between the base station and remote terminal device fails and a relay link between the base station and the remote terminal device is normal, send a fifth reconfiguration message to the remote terminal device, or send a sixth reconfiguration message to relay terminal device, where the relay link includes a terminal-to-terminal direct link between the remote terminal device and the relay terminal device and a second cellular direct link between the relay terminal device and the base station, the third reconfiguration message is used to instruct the remote terminal device to delete link configuration information and/or a buffered data packet that are/is corresponding to the relay link, the fourth reconfiguration message is used to instruct the relay terminal device to delete link related information corresponding to the remote terminal device, the fifth reconfiguration message is used to instruct the remote terminal device to switch a transmission path of a communication service from the first cellular direct link to the relay link, and the sixth reconfiguration message is used to instruct the relay terminal device to switch a transmission path of a communication service of the remote terminal device from the first cellular direct link to the relay link.

In this embodiment, the base station 160 is presented in a form of a functional unit. The "unit" herein may be an ASIC circuit, a processor and a memory that execute one or more software or firmware programs, an integrated logic circuit, and/or another component that can provide the functions. The base station 160 may use a form shown in FIG. 10. The sending unit 1601 may be implemented by using the processor 1001 in FIG. 10, or may be implemented by using the communications module 1003 in FIG. 10.

Optionally, the base station 160 further includes:

a receiving unit, configured to: receive a fifth indication message sent by the remote terminal device over the relay link, or receive a third preset random access preamble message sent by the remote terminal device, or receive a second RRC reestablishment request message sent by the remote terminal device, or receive a sixth indication message sent by the relay terminal device over the second cellular direct link, where the fifth indication message, the third preset random access preamble message, or the sixth indication message is used to indicate that the first cellular direct link fails; and a acquiring unit, configured to acquire, based on the fifth indication message, the third preset random access preamble message, the second RRC reestablishment request message, or the sixth indication message, that the first cellular direct link fails.

It should be noted that, functions of the functional units of the base station 160 described in this embodiment of the present invention may be implemented based on the related descriptions of the base station in the embodiment shown in FIG. 5 or FIG. 6. Details are not described herein again.

Figure 17:
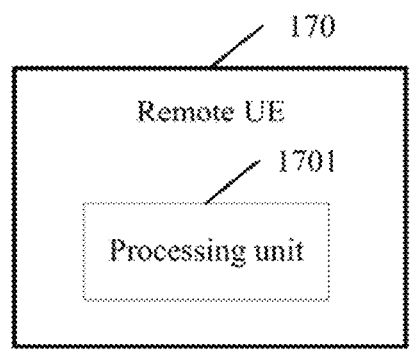
FIG. 17 is a schematic structural diagram of another remote terminal device according to an embodiment of the present invention.

FIG. 17 is a schematic structural diagram of another remote terminal device according to an embodiment of the present invention. As shown in FIG. 17, the remote terminal device 170 includes a processing unit 1701.

The processing unit 1701 is configured to: when a first cellular direct link between the remote terminal device and a base station fails and a relay link between the base station and the remote terminal device is normal, delete link configuration information and/or a buffered data packet that are/is corresponding to the relay link based on a third reconfiguration message sent by the base station; or when a first cellular direct link between the remote terminal device and a base station fails and a relay link between the base station and the remote terminal device is normal, switch a transmission path of a communication service from the first cellular direct link to the relay link; or when a first cellular direct link between the remote terminal device and a base station fails and a relay link between the base station and the remote terminal device is normal, switch a transmission path of a communication service from the first cellular direct link to the relay link based on a fifth reconfiguration message sent by the base station, where the relay link includes a terminal-to-terminal direct link between the remote terminal device and the relay terminal device and a second cellular direct link between the relay terminal device and the base station.

In this embodiment, the remote terminal device 170 is presented in a form of a functional unit. The "unit" herein may be an ASIC, a processor and a memory that execute one or more software or firmware programs, an integrated logic circuit, and/or another component that can provide the functions. The remote terminal device 170 may use a form shown in FIG. 11. The processing unit 1701 may be implemented by using the processor 1101 in FIG. 11.

Optionally, the remote terminal device 170 further includes:

a sending unit, configured to: when the remote terminal device acquires that the first cellular direct link fails, send a fifth indication message to the base station over the relay link, or send a third preset random access preamble message to the base station, or send a second RRC reestablishment request message to the base station, where the fifth indication message, the third preset random access preamble message, or the second RRC reestablishment request message is used to indicate that the first cellular direct link fails; and a receiving unit, configured to receive the third reconfiguration message sent by the base station.

Optionally, that the processing unit 1701 deletes link configuration information and/or a buffered data packet that are/is corresponding to the relay link based on a third reconfiguration message sent by the base station is specifically:

deleting the link configuration information and/or the buffered data packet that are/is corresponding to the relay link based on an identifier of the relay link that is carried in the third reconfiguration message sent by the base station.

It should be noted that, functions of the functional units of the remote terminal device 170 described in this embodiment of the present invention may be implemented based on the related descriptions of the remote terminal device in the embodiment shown in FIG. 5 or FIG. 6. Details are not described herein again.

Figure 18:
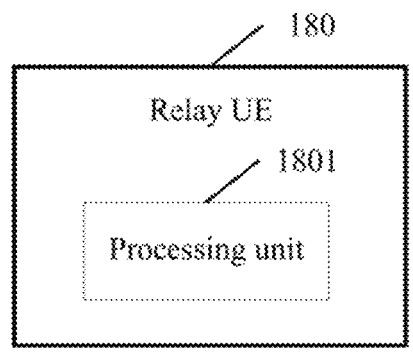
FIG. 18 is a schematic structural diagram of another relay terminal device according to an embodiment of the present invention.

FIG. 18 is a schematic structural diagram of another relay terminal device according to an embodiment of the present invention. As shown in FIG. 18, the relay terminal device 180 includes a processing unit 1801.

The processing unit 1801 is configured to: when a first cellular direct link between remote terminal device and a base station fails and a relay link between the base station and the remote terminal device is normal, delete link related information corresponding to the remote terminal device based on a fourth reconfiguration message sent by the base station; or when a first cellular direct link between remote terminal device and a base station fails and a relay link between the base station and the remote terminal device is normal, switch a transmission path of a communication service of the remote terminal device from the first cellular direct link to the relay link based on a sixth reconfiguration message sent by the base station, where the relay link includes a terminal-to-terminal direct link between the remote terminal device and the relay terminal device and a second cellular direct link between the relay terminal device and the base station.

In this embodiment, the relay terminal device 180 is presented in a form of a functional unit. The "unit" herein may be an ASIC, a processor and a memory that execute one or more software or firmware programs, an integrated logic circuit, and/or another component that can provide the functions. The relay terminal device 180 may use a form shown in FIG. 12. The processing unit 1801 may be implemented by using the processor 1201 in FIG. 12.

Optionally, the relay terminal device 180 further includes:

a sending unit, configured to: when the relay terminal device acquires that the first cellular direct link between the base station and the remote terminal device fails, send a sixth indication message to the base station over the second cellular direct link, where the sixth indication message is used to indicate that the first cellular direct link fails; and a receiving unit, configured to receive the fourth reconfiguration message sent by the base station.

Optionally, that the processing unit 1801 deletes link related information corresponding to the remote terminal device based on a fourth reconfiguration message sent by the base station is specifically:

when a relay radio bearer RB on the second cellular direct link is allocated to only the remote terminal device, deleting the relay RB, and configuration information and/or a buffered data packet that are/is corresponding to the relay RB based on an identifier of the relay link that is carried in the fourth reconfiguration message sent by the base station; or when a relay radio bearer RB on the second cellular direct link is not allocated to only the remote terminal device, delete configuration information and/or a buffered data packet that are/is in the relay RB and corresponding to the remote terminal device based on an identifier of the remote terminal device that is carried in the fourth reconfiguration message sent by the base station.

Optionally, that the processing unit 1801 switches a transmission path of a communication service of the remote terminal device from the first cellular direct link to the relay link based on a sixth reconfiguration message sent by the base station is specifically:

reconfiguring a protocol layer corresponding to the remote terminal device based on reconfiguration information corresponding to a cellular RB of the remote terminal device that is carried in the sixth reconfiguration message sent by the base station, and switching the transmission path of the communication service of the remote terminal device from the first cellular direct link to the relay link.

It should be noted that, functions of the functional units of the relay terminal device 180 described in this embodiment of the present invention may be implemented based on the related descriptions of the relay terminal device in the embodiment shown in FIG. 5 or FIG. 6. Details are not described herein again.

In conclusion, according to the embodiments of the present invention, after the relay link between the remote terminal device and the base station fails, the base station instructs the relay terminal device to delete the link configuration information and/or the buffered data packet that are/is corresponding to the remote terminal device, so as to release corresponding resources and reduce resource occupation; and the base station instructs the remote terminal device to switch a communication link, to instruct the remote terminal device to no longer use the relay link to communicate with the base station but use the cellular direct link to communicate with the base station, thereby ensuring normal operation of the service and avoiding communication interruption. After the first cellular direct link between the remote terminal device and the base station fails, the base station instructs the relay terminal device to delete the link configuration information and/or the buffered data packet that are/is corresponding to the remote terminal device, so as to release corresponding resources and reduce resource occupation; and the base station instructs the remote terminal device to delete the link configuration information and/or the buffered data packet that are/is corresponding to the relay link, so as to release corresponding resources and reduce resource occupation. Alternatively, after the first cellular direct link between the remote terminal device and the base station fails, the base station instructs the relay terminal device to hand over the communication service of the remote terminal device to the relay link, so as to ensure normal communication of the remote terminal device, and instructs the remote terminal device to no longer use the first cellular direct link to communicate with the base station but use the relay link to communicate with the base station, thereby ensuring normal operation of the service and avoiding communication interruption.

In the foregoing embodiments, the description of each embodiment has respective focuses. For a part that is not described in detail in an embodiment, reference may be made to related descriptions in other embodiments.

A person of ordinary skill in the art may understand that all or some of the steps of the method embodiments may be implemented by hardware related to a program control terminal device. The foregoing program may be stored in a computer readable storage medium. When the program runs, the steps of the method embodiments are performed. The foregoing storage medium includes: any medium that can store program code, such as a magnetic disk, an optical disc, a flash memory, a ROM, and a RAM.

The radio link failure handling method, the related device, and the communications system provided in the embodiments of the present invention are described in detail above. The principle and implementation of the present invention are described herein through specific examples. The description about the embodiments is merely provided to help understand the method and core ideas of the present invention. In addition, a person of ordinary skill in the art can make variations and modifications in terms of the specific implementations and application scopes according to the ideas of the present invention. Therefore, the content of this specification shall not be construed as a limitation on the present invention.

What is claimed is:

1. A radio link failure handling method in a base station, comprising:
when a relay link between the base station and a remote terminal device fails and a first cellular direct link between the base station and the remote terminal device is normal, sending a first reconfiguration message to the remote terminal device; and
sending a second reconfiguration message to a relay terminal device, wherein the relay link comprises a terminal-to-terminal direct link between the remote terminal device and the relay terminal device and a second cellular direct link between the relay terminal device and the base station,
wherein the failure of the relay link comprises at least one of a failure of the terminal-to-terminal direct link or a failure of the second cellular direct link,
wherein the first reconfiguration message instructs the remote terminal device to switch a transmission path of a communication service from the relay link to the first cellular direct link, and the second reconfiguration message instructs the relay terminal device to delete link related information corresponding to the remote terminal device,
wherein the first reconfiguration message comprises parameter information of each protocol layer of a cellular radio bearer (RB) of the remote terminal device and an identifier of the relay link to be deleted, and
wherein the parameter information enables the remote terminal device to reestablish a protocol layer of the cellular RB and switch the transmission path of the cellular RB from the relay link to the first cellular direct link when the cellular RB of the remote terminal device was carried on only the relay link.

2. The method according to claim 1, further comprising:
receiving, by the base station, at least one of a first indication message sent by the remote terminal device over the first cellular direct link,
a first preset random access preamble message sent by the remote terminal device, or
a second indication message sent by the relay terminal device over the second cellular direct link,
wherein the at least one of the first indication message, the first preset random access preamble message, or the second indication message indicates the failure of the terminal-to-terminal direct link; and
acquiring, by the base station, based on the received at least one of the first indication message, the first preset random access preamble message, or the second indication message, that the relay link has failed.

3. The method according to claim 1, further comprising:
receiving, by the base station, at least one of a third indication message sent by the remote terminal device over the first cellular direct link,
a second preset random access preamble message sent by the remote terminal device, or a first radio resource control (RRC) reestablishment request message sent by the relay terminal device,
wherein the at least one of the third indication message, the second preset random access preamble message, or the first RRC reestablishment request message indicates the failure of the second cellular direct link; and
acquiring, by the base station based on the received at leas one of the third indication message, the second preset random access preamble message, or the first RRC reestablishment request message, that the relay link has failed.

4. The method according to claim 1, wherein the second reconfiguration message comprises at least one of the identifier of the relay link to be deleted or an identifier of the remote terminal device.

5. A radio link failure handling method in a remote terminal device, comprising:
when a relay link between a base station and the remote terminal device fails and a first cellular direct link between the base station and the remote terminal device is normal, switching a transmission path of a communication service from the relay link to the first cellular direct link based on a first reconfiguration message sent by the base station,
wherein the relay link comprises a terminal-to-terminal direct link between the remote terminal device and a relay terminal device and a second cellular direct link between the relay terminal device and the base station, and the failure of the relay link comprises at least one of a failure of the terminal-to-terminal direct link or a failure of the second cellular direct link,
wherein when a cellular radio bearer (RB) of the remote terminal device was carried on only the relay link, the remote terminal device reestablishes a protocol layer of the cellular RB based on parameter information of each protocol layer of the cellular RB carried in the first reconfiguration message, and switches a transmission path of the cellular RB from the relay link to the first cellular direct link.

6. The method according to claim 5, further comprising:
when acquiring that the terminal-to-terminal direct link has failed, sending, by the remote terminal device, at least one of a first indication message to the base station over the first cellular direct link, or a first preset random access preamble message to the base station, wherein the at least one of the first indication message or the first preset random access preamble message indicates the failure of the terminal-to-terminal direct link; and
receiving, by the remote terminal device, the first reconfiguration message sent by the base station.

7. The method according to claim 5, further comprising:
when acquiring that the second cellular direct link has failed sending, by the remote terminal device, at least one of a third indication message to the base station over the first cellular direct link, or a second preset random access preamble message to the base station, wherein the at least one of the third indication message or the second preset random access preamble message indicates the failure of the second cellular direct link; and
receiving, by the remote terminal device, the first reconfiguration message sent by the base station.

8. The method according to claim 7, further comprising:
receiving, by the remote terminal device, a fourth indication message sent by the relay terminal device, wherein the fourth indication message indicates the failure of the second cellular direct link; and
acquiring, by the remote terminal device based on the fourth indication message, that the second cellular direct link has failed.

9. The method according to claim 5, wherein:
when a cellular RB of the remote terminal device was not carried an only the relay link, the remote terminal device deletes at least one of link configuration information or a buffered data packet that corresponds to the relay link based on an identifier of the relay link carried in the first reconfiguration message, and hands over the cellular RB from the relay link to the first cellular direct link.

10. A radio link failure handling apparatus, comprising:
in a base station, a memory, configured to store program instructions and data; and
a transmitter, configured to, when the base station acquires that a relay link between the base station and a remote terminal device has failed and a first cellular direct link between the base station and the remote terminal device is normal,
send a first reconfiguration message to the remote terminal device, and
send a second reconfiguration message to a relay terminal device, wherein the relay link comprises a terminal-to-terminal direct link between the remote terminal device and the relay terminal device and a second cellular direct link between the relay terminal device and the base station,
wherein the failure of the relay link comprises at least one of a failure of the terminal-to-terminal direct link or a failure of the second cellular direct link,
wherein the first reconfiguration message instructs the remote terminal device to switch a transmission path of a communication service from the relay link to the first cellular direct link, and the second reconfiguration message instructs the relay terminal device to delete link related information corresponding to the remote terminal device,
wherein the first reconfiguration message comprises parameter information of each protocol layer of a cellular radio bearer (RB) of the remote terminal device and an identifier of the relay link to be deleted, and
wherein the parameter information enables the remote terminal device to reestablish a protocol layer of the cellular RB and switch the transmission path of the cellular RB from the relay link to the first cellular direct link when the cellular RB of the remote terminal device was carried on only the relay link.

11. The apparatus according to claim 10, further comprising:
a receiver, configured to receive at least one of a first indication message sent by the remote terminal device over the first cellular direct link, a first preset random access preamble message sent by the remote terminal device, or a second indication message sent by the relay terminal device over the second cellular direct link, wherein the at least one of the first indication message, the first preset random access preamble message, or the second indication message indicates the failure of the terminal-to-terminal direct link; and
a processor, configured to acquire, based on the received at least one of the first indication message, the first preset random access preamble message, or the second indication message, that the relay link has failed.

12. The apparatus according to claim 10, further comprising:
a receiver, configured to receive at least one of a third indication message sent by the remote terminal device over the first cellular direct link, a second preset random access preamble message sent by the remote terminal device, or a first radio resource control (RRC) reestablishment request message sent by the relay terminal device, wherein the at least one of the third indication message, the second preset random access preamble message, or the first RRC reestablishment request message indicates the failure of the second cellular direct link; and a processor, configured to acquire, based on the received at least one of the third indication message, the second preset random access preamble message, or the first RRC reestablishment request message, that the relay link has failed.

13. The apparatus according to claim 10, wherein the second reconfiguration message comprises at least one of the identifier of the relay link to be deleted or an identifier of the remote terminal device.

14. A radio link failure handling apparatus, comprising:
in a remote terminal device, a memory, configured to store program instructions and data; and
a processor, configured to: when a relay link between a base station and the remote terminal device fails and a first cellular direct link between the base station and the remote terminal device is normal, switch a transmission path of a communication service from the relay link to the first cellular direct link based on a first reconfiguration message sent by the base station,
wherein the relay link comprises a terminal-to-terminal direct link between the remote terminal device and a relay terminal device and a second cellular direct link between the relay terminal device and the base station, and the failure of the relay link comprises at least one of a failure of the terminal-to-terminal direct link or a failure of the second cellular direct link,
wherein the processor is further configured to, when a cellular radio bearer (RB) of the remote terminal device was carried on only the relay link, reestablish a protocol layer of the cellular RB based on parameter information of each protocol layer of the cellular RB carried in the first reconfiguration message, and switch a transmission path of the cellular RB from the relay link to the first cellular direct link.

15. The apparatus according to claim 14, further comprising:
a transmitter, configured to: when acquiring that the terminal-to-terminal direct link has failed, send at least one of a first indication message to the base station over the first cellular direct link, or a first preset random access preamble message to the base station, wherein the at least one of the first indication message or the first preset random access preamble message indicates the failure of the terminal-to-terminal direct link; and
a receiver, configured to receive the first reconfiguration message sent by the base station.

16. The apparatus according to claim 14, further comprising:
a transmitter, configured to: when acquiring that the second cellular direct link has failed, send at least one of a third indication message to the base station over the first cellular direct link, or a second preset random access preamble message to the base station, wherein the at least one of the third indication message or the second preset random access preamble message indicates the failure of the second cellular direct link; and
a receiver, configured to receive the first reconfiguration message sent by the base station.

17. The apparatus according to claim 16, wherein the receiver is further configured to:
receive a fourth indication message sent by the relay terminal device, wherein the fourth indication message indicates the failure of the second cellular direct link, and
the processor is further configured to acquire that the second cellular direct link has failed based on the fourth indication message.

18. The apparatus according to claim 14, wherein the processor is further configured to:
    when the cellular RB of the remote terminal device was not carried on only the relay link, delete at least one of link configuration information or a buffered data packet that corresponds to the relay link based on an identifier of the relay link carried in the first reconfiguration message, and hand over the cellular RB from the relay link to the first cellular direct link.

\* \* \* \* \*